(12) United States Patent
Taylor et al.

(10) Patent No.: US 7,490,575 B2
(45) Date of Patent: Feb. 17, 2009

(54) COMBINATION FREEZE INDICATORS

(75) Inventors: Dene H. Taylor, New Hope, PA (US);
Thaddeus Prusik, Stroudsburg, PA (US); Dawn Smith, Martinsville, NJ (US)

(73) Assignee: Temptime Corporation, Morris Plains, NJ (US)

( * ) Notice: Subject to any disclaimer, the term of this patent is extended or adjusted under 35 U.S.C. 154(b) by 0 days.

(21) Appl. No.: 11/557,841

(22) Filed: Nov. 8, 2006

(65) Prior Publication Data
US 2007/0125296 A1   Jun. 7, 2007

Related U.S. Application Data

(60) Provisional application No. 60/735,152, filed on Nov. 8, 2005.

(51) Int. Cl.
*G01K 3/04* (2006.01)
*G01K 11/12* (2006.01)
(52) U.S. Cl. .................. 116/216; 116/207; 374/106
(58) Field of Classification Search .............. 116/207, 116/216, 217, 218, 219; 374/106, 159, 161, 374/162; 252/962; 426/88
See application file for complete search history.

(56) References Cited

U.S. PATENT DOCUMENTS

| | | | |
|---|---|---|---|
| 2,971,852 A | 2/1961 | Schulein | |
| 3,145,145 A | 8/1964 | Reznek et al. | |
| 3,194,669 A | 7/1965 | Koch | |
| 3,243,303 A * | 3/1966 | Johnson | 426/88 |
| 3,954,011 A * | 5/1976 | Manske | 374/102 |
| 4,028,944 A | 6/1977 | Erb | |
| 4,148,748 A | 4/1979 | Hanlon et al. | |
| 4,189,399 A | 2/1980 | Patel | |
| 4,191,125 A | 3/1980 | Johnson | |

(Continued)

FOREIGN PATENT DOCUMENTS

EP    1645856 A1 *   4/2006

(Continued)

OTHER PUBLICATIONS

"Standard and Customized Thermal Sensors Delivered . . . etc. Products—New Freeze..", www.americanthermal.com, 2005 American Thermal Instruments, Inc., (downloaded Oct. 2, 2006).

(Continued)

*Primary Examiner*—R. Alexander Smith
(74) *Attorney, Agent, or Firm*—K & L Gates LLP

(57) ABSTRACT

A combination temperature exposure indicator suitable for attachment to, or association with, a host product has a substrate, a freeze indicator supported by the substrate and a cumulative ambient time-temperature indicator also supported by the substrate. The freeze indicator can provide a visual indication of exposure of the freeze indicator to a freezing or near-freezing temperature and the cumulative time-temperature indicator can provide a visual indication of exposure of the cumulative time-temperature indicator to a predetermined cumulative time-temperature value. Also disclosed are: a combination freeze indicator and threshold temperature indicator; a combination threshold indicator and cumulative temperature indicator; and three-way combination indicators that can provide indications of cumulative past temperature exposure, exposure to freezing temperatures and exposure to a temperature above a threshold.

31 Claims, 7 Drawing Sheets

U.S. PATENT DOCUMENTS

| | | | |
|---|---|---|---|
| 4,195,056 A | 3/1980 | Patel | |
| 4,195,058 A * | 3/1980 | Patel | 422/56 |
| 4,246,302 A * | 1/1981 | Benton et al. | 428/1.25 |
| 4,384,980 A | 5/1983 | Patel | |
| 4,457,252 A | 7/1984 | Manske | |
| 4,457,253 A | 7/1984 | Manske | |
| 4,646,066 A | 2/1987 | Baughman et al. | |
| 4,788,151 A | 11/1988 | Preziosi et al. | |
| 4,789,637 A | 12/1988 | Preziosi et al. | |
| 4,846,095 A | 7/1989 | Emslander | |
| 4,892,677 A | 1/1990 | Preziosi et al. | |
| 4,998,827 A * | 3/1991 | Holzer | 374/160 |
| 5,058,999 A * | 10/1991 | Davis | 349/197 |
| 5,111,768 A | 5/1992 | Larsson et al. | |
| 5,202,677 A * | 4/1993 | Parker et al. | 349/21 |
| 5,215,378 A | 6/1993 | Manske | |
| 5,239,942 A | 8/1993 | Ignacio et al. | |
| 5,460,117 A * | 10/1995 | Loustaunau | 116/218 |
| 5,964,181 A | 10/1999 | Pereyra et al. | |
| 6,270,122 B1 | 8/2001 | Shadle et al. | |
| 6,472,214 B2 | 10/2002 | Patel | |
| 6,737,274 B1 | 5/2004 | Wright | |
| 6,837,620 B2 | 1/2005 | Shahinpoor | |
| 6,957,623 B2 | 10/2005 | Guisinger et al. | |
| 7,209,042 B2 | 4/2007 | Martin et al. | |
| 2004/0253733 A1 | 12/2004 | Prusik et al. | |
| 2005/0178314 A1* | 8/2005 | McGuire | 116/216 |
| 2006/0145863 A1* | 7/2006 | Martin et al. | 340/572.8 |
| 2006/0247967 A1 | 11/2006 | Prusik et al. | |

FOREIGN PATENT DOCUMENTS

WO    WO 2007148321 A2 * 12/2007

OTHER PUBLICATIONS

"MesoSilver®—True colloidal silver", (2005) Purest Colloids, Inc. www.purestcolloids.com, (downloaded Oct. 27, 2006).

"Hot Tub Silver", (2002) Purest Colloids, Inc., www.purestcolloids.com, (downloaded Oct. 27, 2006).

"MesoGold®—True colloidal gold", (2002) Purest Colloids, Inc. www.purestcolloids.com, (downloaded Oct. 16, 2006).

Vali, "Ice Nucleation C Theory. A Tutorial", for presentation at the NCAR/ASP 1999 Summer Colloquium, <vali@uwyo.edu>, http://www-das.uwyo.edu/vali, (downloaded Oct. 16, 2006).

International Search Report and Written Opinion dated Jan. 30, 2008 for the International Patent Application No. PCT/US06/60681.

* cited by examiner

| | |
|---|---|
| | PRINTABLE INDICIA 27 |
| | PERIPHERAL RING 26 |
| | OUTER LAYER 28 |
| | TRANSPARENT VAPOR BLOCK LAYER 30 |
| | THERMOFORMABLE INNER LAYER 32 |
| | WATER BARRIER LAYER 22 |
| | SUBSTRATE VAPOR BLOCK LAYER 24 |
| | CARRIER SUBTRATE 12 |
| | ADHESIVE LAYER 14 |
| | LINER 16 |

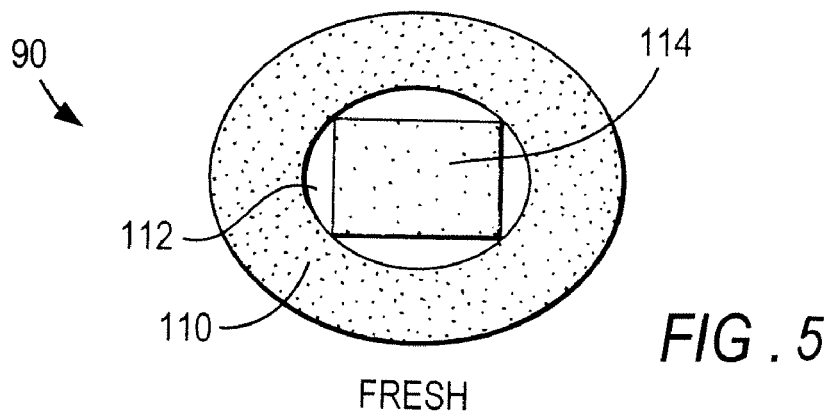
FIG. 5 FRESH
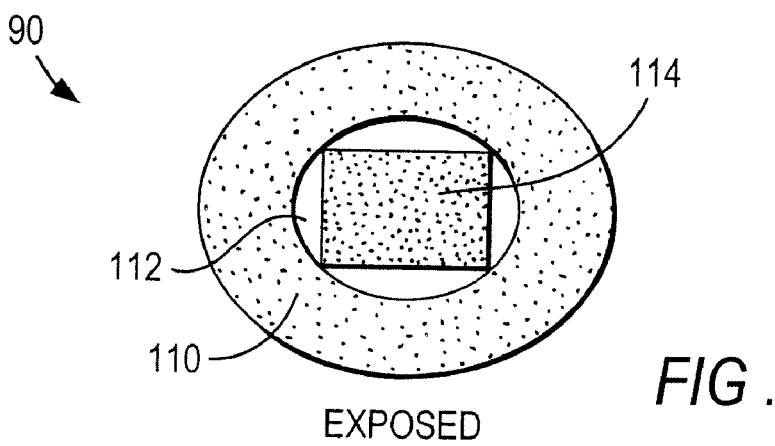
FIG. 6 EXPOSED
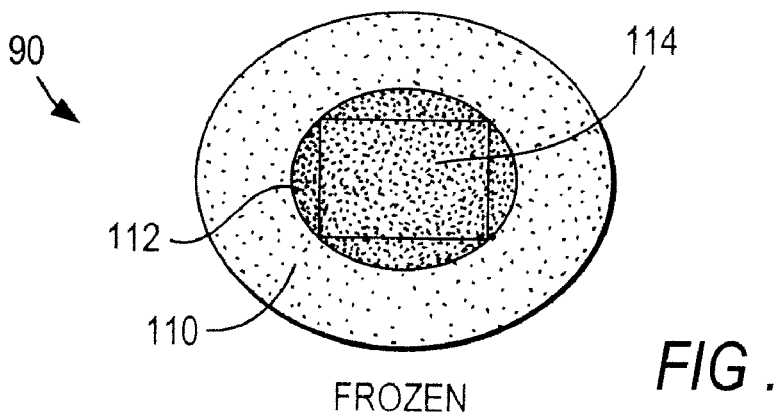
FIG. 7 FROZEN

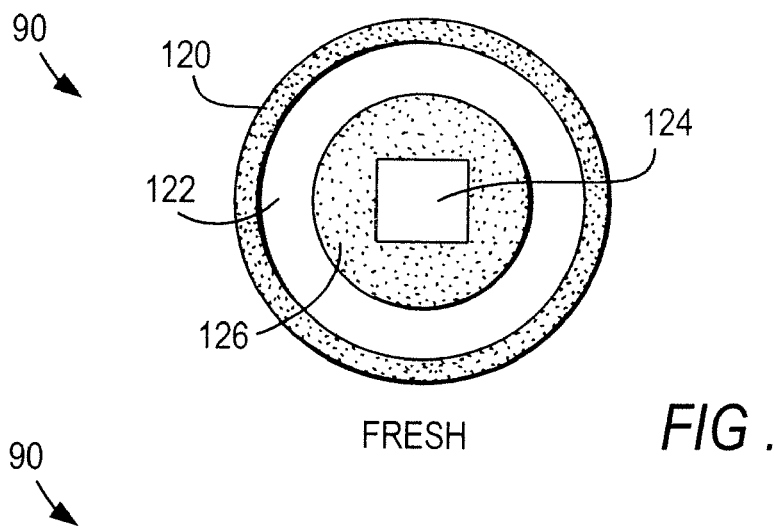
FIG. 8 FRESH
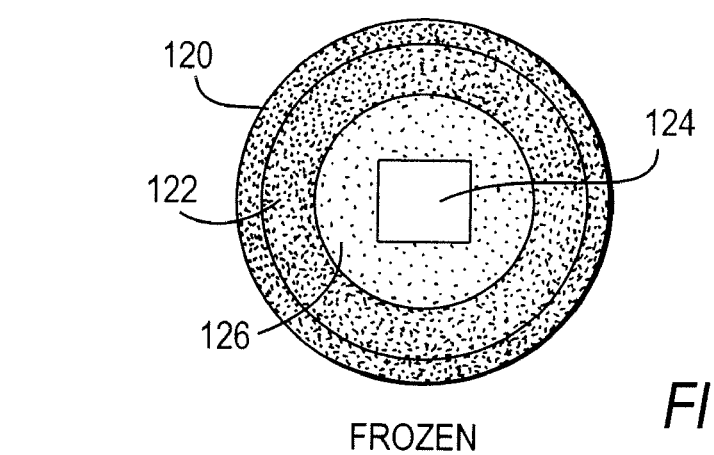
FIG. 10 FROZEN
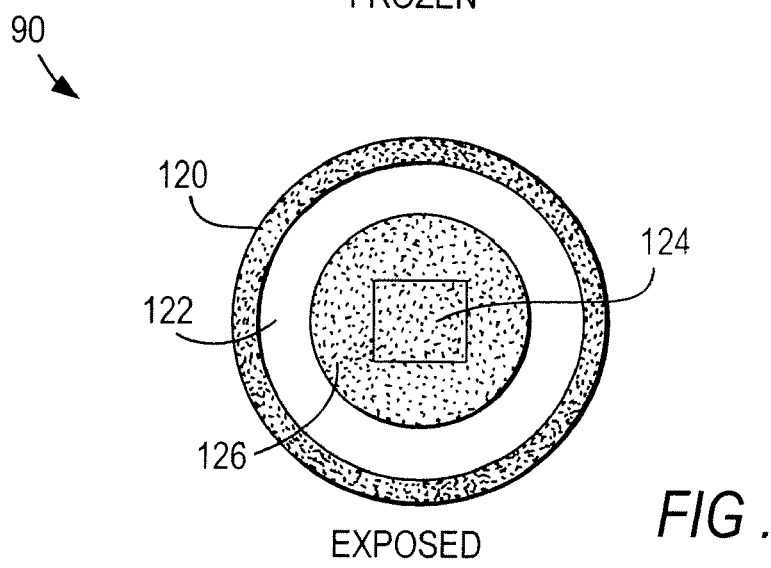
FIG. 9 EXPOSED

COMBINATION FREEZE INDICATORS

CROSS-REFERENCES TO RELATED APPLICATIONS

This application claims the benefit of Taylor et al. provisional patent Application No. 60/735,152 filed Nov. 8, 2005 the disclosure of which is incorporated by reference herein.

Copending, commonly owned U.S. patent application Ser. No. 11/557,000 filed Nov. 6, 2006 of Taylor et al., entitled, "Freeze Indicators Suitable For Mass Production", describes a related freeze indicator. The entire disclosure of application Ser. No. 11/557,000 is also incorporated by reference herein.

STATEMENT REGARDING FEDERALLY SPONSORED RESEARCH OR DEVELOPMENT (Not applicable.)

TECHNICAL FIELD

The invention relates to a combination freeze indicator capable of providing in a single device a reliable visual indication of exposure to freezing and of cumulative ambient temperature exposure over time. The inventive combination freeze indicator can be employed to monitor whether an associated host product has been subject to an undesirable freeze-related temperature event or to undesired cumulative ambient temperature exposure. Certain embodiments of the invention are combination freeze indicators that are suitable for attachment to small host products, for example, vaccine vials or syringes.

BACKGROUND OF THE INVENTION

Some biological products, for example vaccines, and other condition-sensitive products of commercial importance are not only subject to spoil, deteriorate or lose quality if exposed, even briefly, to a temperature near or below freezing but also age at ambient temperatures, and accordingly have a limited shelf life within which the product should be used to avoid spoilage. Thus, a vaccine distributed in a tropical climate may have a life of only a few weeks which is significantly shortened if the vaccine is extensively exposed to ambient temperatures in excess of about 25, or about 30° C. (about 77° F. or about 86° F. or more). Effective cumulative temperature indicators are known, such as the vaccine condition indicators supplied by the assignee of the present invention, TEMP-TIME Corporation, which are specified for use in UNICEF/WHO vaccination programs.

Vaccines commonly are protected from excessive temperature exposure by keeping them in portable cold storage containers using blue ice or equivalent measures. However, such measures run the risk of causing freeze-related damage to vaccine samples in the vials or syringes from cold ambient temperatures in mountainous areas and the like or possibly in the bulk container, from adjacency to the blue ice or container walls contacting the blue ice or other coolant. Such freeze-damaged samples may have lost immunological virulence and should be discarded. It is presently understood that the art lacks useful devices that will enable a medical technician, or other user, readily to determine, in such circumstances, in the field at the point of care, or elsewhere, which vaccine samples are in good condition and which are not.

Various freeze indicators are known or have been proposed. For example, U.S. Pat. No. 4,148,748 to Hanlon et al. ("Hanlon") discloses a nonreversible freeze-thaw indicator intended to detect whether an article has been subjected to freezing or thawing conditions. Hanlon's indicator employs a colloidal dispersion of organic solid particles of a polymeric resinous material, which may beneficially be in latex form, for example, styrene polymers. Various other styrene, vinyl and vinylidine polymers and copolymers are mentioned. Hanlon's colloidal dispersions are described as becoming nonreversibly destabilized upon freezing, transforming a translucent dispersion to a substantially opaque dispersion.

U.S. Pat. No. 4,191,125 to Johnson ("Johnson") discloses a freeze indicator which includes a frangible ampoule substantially filled with a mixture of water, a nucleating agent, and a surfactant. Upon reaching the freezing point of water, the water mixture freezes fracturing the frangible ampoule. According to Johnson: a nucleating agent can be used to overcome the undercooling effect; a dye-printed pad can be employed to show a color change; and deuterium oxide may be added to raise the freezing point.

U.S. Pat. No. 4,646,066 to Baughman ("Baughman") discloses an indicator device employing a tuned electrical circuit interrogatable by an RF signal in the microwave range or lower. The tuned circuit includes an element having an electrical property that changes in a predetermined fashion in response to a particular environmental parameter. Baughman suggests that various freeze-induced phenomena such as rupture of saline-containing microcapsules or demulsification of liquids, for example, salad dressing, can provide a conductance change in the tuned circuit element which may be detected on interrogation, enabling freezing to be monitored.

Other freeze indicators based on comparable or different technologies are also known to those skilled in the art.

SUMMARY OF THE INVENTION

The present invention provides a combination temperature exposure indicator which, in a single device, provides a visual indication of freeze exposure or of undue ambient temperature exposure. The combination temperature exposure indicator of the invention can associated with a host product to indicate exposures to which the host product may have been subject.

The invention further provides a combination temperature exposure which is simple, reliable and inexpensive. One embodiment of the invention comprises a small unit, for example small enough to be attachable to a vaccine vial.

In one aspect, the invention provides a combination temperature exposure indicator suitable for attachment to a host product, the combination temperature exposure indicator comprising:
  a) a substrate;
  b) a freeze indicator supported by the substrate; and
  c) cumulative ambient time-temperature indicator supported by the substrate;

wherein the freeze indicator provides a visual indication of exposure of the freeze indicator to a freezing temperature and the time-temperature indicator provides a visual indication of exposure of the time-temperature indicator to a predetermined cumulative time temperature value or other suitable end point.

The visual indications provided by the freeze and ambient time-temperature indicators can, in one useful embodiment, be provided in a common display area. If desired, the common display area can be a combined display wherein the area of one visual indication lies within the area of the other visual indication.

The cumulative time-temperature indicator can be supported on the substrate by the freeze indicator. In one embodiment of the invention, the freeze indicator and the cumulative time-temperature indicator can have visually similar end points. With advantage, to facilitate reading of the indicator signals, a reference zone having a similar appearance to the freeze indicator and also to the cumulative time-temperature indicator at their end points, can be provided.

In another aspect the invention provides a method of supplying a perishable product, optionally a vaccine, for use, the method comprising:
a) affixing a combination temperature exposure indicator, at a distribution point, to each individual unit of a batch of units of the perishable product;
b) transporting the batch of units of the perishable product, each having a combination temperature-sensitive indicator affixed thereto, to a point of use;
c) at the point of use, inspecting the combination indicators; and
d) at the point of use, selecting for use a perishable product bearing an indicator displaying a satisfactory exposure indication. The combination temperature exposure indicator can be responsive to freeze exposure and to cumulative ambient temperature exposure and can provide one or more indications of past exposure.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which:

FIG. 5 is a top plan view of a portion of a first modified version of a combination freeze indicator such as that shown in FIG. 4 as it might appear when associated with a host product in fresh condition;

FIG. 6 is a view similar to FIG. 5 of the combination indicator shown in FIG. 5 as it might appear when the host product has been exposed to ambient heat;

FIG. 7 is a view similar to FIG. 5 of the combination indicator shown in FIG. 5 as it might appear when frozen;

FIG. 8 is a top plan view of a second modified version of a combination freeze indicator such as that shown in FIG. 4 as it might appear when associated with a host product in fresh condition;

FIG. 9 is a view similar to FIG. 8 of the combination indicator shown in FIG. 5 as it might appear when the host product has been exposed to ambient heat;

FIG. 10 is a view similar to FIG. 8 of the combination indicator shown in FIG. 5 as it might appear when frozen;

DETAILED DESCRIPTION OF THE INVENTION

Figure 1:
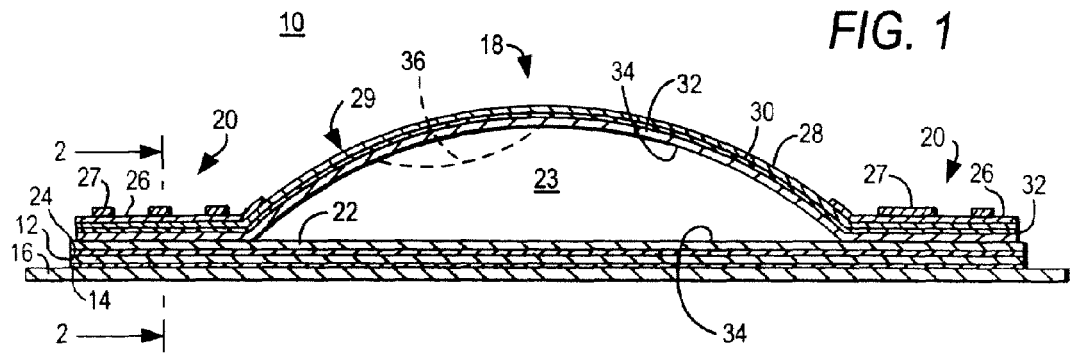
FIG. 1 is a cross-sectional view of a freeze indicator suitable for monitoring the exposure of sensitive items to freeze-inducing temperatures, which can usefully be employed in one embodiment of combination indicator according to the invention.

Freeze indicators which can usefully be incorporated as components of the combination indicators of the invention will now be described. Such freeze indicators can employ an active indicator comprising a visually active dispersion of solid particles in a liquid medium which dispersion provides a distinct appearance change indicative of freeze exposure. Some embodiments of the invention employ novel vapor sealing techniques to prolong the effective life of the freeze indicator. The invention includes embodiments employing novel dispersions including dispersions of inorganic pigments, for example, metals or metal oxides, in water, aqueous media or other suitable dispersion media.

The invention includes useful embodiments which are small, low-cost freeze indicators that can be mass produced and provide a consistent response from one indicator to the next. Such small freeze indicators according to the invention may have rather small indicator volumes measurable in, for example microliters or tens of microliters. Notwithstanding the shortness of the light path through the liquid medium, the invention provides active indicator elements which can give a good visual signal of freeze exposure, for example by exhibiting a pronounced change in opacity, reflectivity, or both as a result of freeze exposure.

Further embodiments of the invention can provide a clear visual signal in response to a defined freeze exposure event for example exposure to a particular temperature or temperature interval for a specific time interval. Desirably, most, if not all, of a production batch of freeze indicators can respond to the defined temperature event providing a desired visual signal. For example, in the case of monitoring of the freezing point of water, the defined temperature event can be one hour at −2° C.$\pm$0.2° C. Other temperature events can of course be defined or selected to suit particular purposes. Desirable consistency can comprise a satisfactory visual response from at least about 90% of freeze indicator units in a batch or sample. Higher consistencies, for example 99% or 99.9% can also be useful.

The invention can employ a novel freeze indicator that is intended usually to be maintained at an ambient temperature which is above freezing and which can give a freeze indication. The freeze indication can be a clear, irreversible indication of current or past exposure of the indicator to a temperature at or near the freezing point of water. It is contemplated that the indicated freezing or near-freezing temperature event will be exposure to a temperature within a few degrees of the freezing point of water for example in the range of from about −10° C. to about 5° C. The duration of the exposure required to activate the indicator includes the time taken for the responsive component of the indicator to cool to the ambient temperature, as well as the time for freezing to occur. This time may be as little as one or two minutes or as much as 30 or 60 minutes or other suitable time period, depending upon the construction of the indicator and a variety of other factors, as will be understood by those skilled in the art.

The terms "water" and "aqueous" are used in this specification to include not only hydrogen oxide, $H_2O$, but also deuterium oxide, $D_2O$, or heavy water, and partially deuterated water, DHO and mixtures of these materials. The concentration of deuterium oxide and/or partially deuterated water can be varied to control the freezing point of the water or aqueous phase.

Freeze indicators responsive to other temperatures than the freezing point or other exposure durations can also be employed, as will be apparent to those skilled in the art in light of this disclosure. Furthermore, in light of this disclosure, those skilled in the art can understand how to provide indicators responsive to other temperatures depressed below ambient, which other temperatures may or may not correspond with the freezing point of a particular material.

Some freeze indicator embodiments useful in practicing the invention can be employed to indicate the actual historical exposure, or event associated with potential exposure, of a host product to a freezing temperature.

Depending upon the composition of the liquid dispersion medium employed, the freezing temperature indicated can be the freezing point of water, the freezing point of an aqueous solution or mixture or the freezing point of an organic, silicone or other solvent, liquid or liquid mixture, if such is employed in the inventive freeze indicator. Desirably, the liquid medium is a single phase before, during and after freeze exposure. Thus, the liquid medium can comprise a single liquid, for example water, or a mixture of miscible liquids which do not separate one from the other or others before, during or after freezing, or after thawing. Other liquids, for example ethyl and other alcohols, toluene or hexane can also be used if desired.

In one embodiment of the invention, active indicator element 23 is free of organic solvents or other organic liquids.

The response temperature can be adjusted, if desired, for example by addition of solutes to depress the freezing point of the liquid medium. By way of example, the depressed temperature in the range of from about −1° C. to about −5° C.

In one non-limiting example, sodium chloride or other suitable solute is included in an appropriate concentration to provide a freeze indication below 0° C. for an aqueous host product having a depressed freezing point. Some examples of such host products include serum, blood, or other bodily fluids and analogs thereof.

Pursuant to further embodiments of the invention, deuterium oxide or other suitable material can be added to raise the freezing point of water or other aqueous dispersion medium employed.

In some commercial situations the freeze indicator may freeze shortly before the host product itself freezes. This phenomenon may be helpful, in some cases, providing advance warning of imminent freezing of the host product. Advance warning may reduce the risk of a possible false positive or a failure to indicate that a potentially damaging exposure of the host product to freezing conditions has occurred. Thus, it will be understood that the inventive freeze indicator indicates by its visual appearance, current or past freezing of the indicator itself rather than actual freezing of the host product, which may or may not have occurred.

The freeze indication provided by a freeze indicator according to the invention can be used in various ways, as will be apparent to those skilled in the art, in light of this disclosure. For example, a host product bearing a freeze indicator giving a negative indication or a freeze exposure indication that renders the condition of the host product open to question, or otherwise undesirable may be handled in a number of different ways. It can be withheld or withdrawn from use, or discarded by a prospective end user, or screened out of a distribution channel or, possibly, remediated.

In some embodiments, freeze indicators useful in practicing the invention can comprise an indicator bubble or housing enclosing an indicator volume, which indicator volume contains an active indicator element or material. The indicator bubble may have any suitable configuration, for example a dome-like configuration or other appropriately contoured configuration. The indicator bubble can be supported on, and project upwardly or outwardly from, an indicator substrate which is attachable to, or associatable with, a host product.

The freeze indicator can be usefully embodied as a small visual indicator that can be applied to, or associated with, a wide variety of host products. Small freeze indicator embodiments may be suitable for economical mass production. However, relatively large embodiments can be provided, if desired. Such larger embodiments can provide an indicator signal with greater visual impact and/or slower response time should these features be desired.

Some host products are freeze-sensitive perishable products, examples of which include vaccine vials and syringes containing perishable biologicals, or other freeze-sensitive products, food products, such as fruits, truffles, gourmet meats, fish and the like whose organoleptic qualities may be impaired by freezing.

Other possible host products can include maturing products such as cheeses and wines, as is described elsewhere herein. Still further possible host products will be known, or become known, to those skilled in the art.

Figure 2:
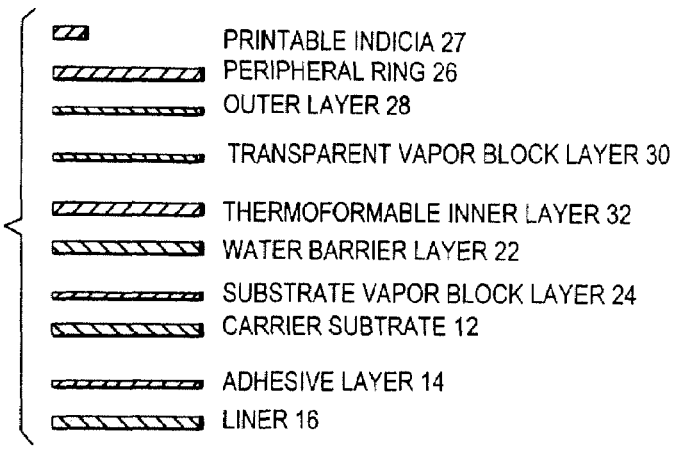
FIG. 2 is an exploded view of the component layers visible on the line 2-2 of FIG. 1, not to scale, showing the descriptions.

Referring now to FIGS. 1-2, the illustrated freeze indicator, referenced 10, comprises a carrier substrate 12 which furnishes structural support for freeze indicator 10, an adhesive layer 14 coated on the underside of substrate 12 and a liner 16. Directional descriptions used herein (e.g. underside) reference the orientation of indicator 10 shown in FIGS. 1 and 2. It will be understood that freeze indicator 10 can have any desired orientation in practice. Liner 16 functions as a release sheet and can be removed to permit freeze indicator 10 to be attached to a host product (not shown) by means of adhesive 14 on liner 16, for which purpose adhesive 14 can be pressure-sensitive, if desired. Liner 16 is desirably flexible, but could be rigid, and can be formed of any suitable film or sheet material, for example, a polymeric, paper or metal film or sheet. Suitable materials for liner 16 and pressure-sensitive adhesives that may be employed are well known in the release sheet or other arts. Alternatively the freeze indicator can be attached to a host product with a separately applied adhesive which can, if desired, be a pressure sensitive, hot melt or chemically reactive adhesive. The adhesive can be applied at the time of application to the host product.

Alternative means for mounting freeze indicator 10 on, or otherwise associating it with a host product, will also be known, or become known, to those skilled in the art. Such alternative means, include, but are not limited to hook-and-loop fastener systems, mechanical projections such as skewers, or hooks, eyes, tape, ties and simple juxtaposition.

The upper surface of substrate 12 carries a transparent or translucent indicator bubble 18 exemplified as having a dome-like shape in the embodiment of the invention illustrated in FIGS. 1-2. Some other possible shapes are described below. Indicator bubble 18 has a peripheral flange 20, which bears on substrate 12, desirably through a heat-sealing water barrier layer 22. Indicator bubble 18 contains an appearance-changing active indicator element 23 contained in an indicator volume 34. Indicator element 23 is the freeze-responsive component of the indicator and is described in more detail below.

Indicator bubble 18 desirably is sufficiently light-transmissive to enable the appearance change to be read at an appropriate viewing distance, for example from about 0.2 m to about 3 m, with the naked eye or other suitable instrument.

Many polymer films suitable for use in freeze indicators have significant vapor transmission rates. Excessive vapor loss during the life of a freeze indicator can lead to loss of liquid dispersion medium or drying out of the indicator. Thus, vapor loss can result in poor or lost performance of the indicator. To ameliorate this problem and enhance the utility of active indicator element 23, the invention provides vapor blocking means. Such means include a first vapor block member comprising vapor block layer 24, on substrate 12 beneath indicator bubble 18. A further vapor block member, to be described in more detail below, can be provided as a layer component of the wall of indicator bubble 18.

Both water barrier layer 22 and vapor block layer 24 are laminar sheets with planar configurations, as illustrated in FIGS. 1-2. An opaque print-receiving peripheral ring 26 surrounds indicator bubble 18, overlying peripheral flange 20. Ring 26 can receive and display text, graphics and/or other printable indicia 27.

Alternatively, or additionally, display text, graphics and other printable indicia can be applied to water vapor layer 22 or to vapor block layer 24.

Ring 26 can be provided by an ink coating of suitable color, or by a separate structural element adhered to flange 20, if desired, for example, a polymeric, paper or metallic film or sheet element. In one embodiment of the invention, ring 26 is a reference ring, or other reference area proximate to active indicator element 23. For this purpose ring 26, or other suitable reference area, can have an appearance selected to match or suggest an end point or other appearance change point of the freeze indicator to help interpret the appearance of active indicator element 23. For example, reference ring 26 can approximately match or suggest the appearance of active indicator 23 after freezing. In one embodiment of the invention, reference ring 26 can provide a visual contrast with the appearance after freezing, for example, reference ring 26 can approximately match or suggest the appearance of active indicator element 23 before freezing.

For example reference ring 26 can have an appearance which is an approximate match to the appearance of active indicator element 23 after it has frozen so that the combined appearance is more or less uniform. This uniform appearance is notably different from the initial indicator appearance wherein indicator element 23 contrasts with surrounding reference ring 26.

Carrier substrate 12 can be fabricated from any suitable material that is expected to fulfill the objectives of the invention in light of this disclosure. Exemplary materials include polymeric material, paper, card or other fibrous or fabric material, laminate, metallic material and metallic composite material. Desirably carrier substrate 12 has strength and durability selected according to the intended end use and desired cost of the freeze indicator.

Carrier substrate 12 can be quite flexible, somewhat flexible or rigid, as may be desired, or appropriate, for a particular host product. Embodiments of freeze indicator 10 employing a flat, but rigid, carrier substrate 12 can be useful for mounting onto a flat top or other flat surface of a host product container such as a vaccine vial. A flexible flat substrate 12 can be employed for mounting on a curved surface such as the side surface of a cylindrical vaccine vial, a syringe, a syringe container or other container for pharmaceuticals or other host products. If desired, substrate 12 can be concavely shaped to conform to a convex container surface, for example a cylindrical or spherical surface.

Water barrier layer 22 can usefully be employed in embodiments of freeze indicator 10 which utilize an aqueous dispersion as an active element. Examples of suitable aqueous dispersions are described in more detail elsewhere herein. Desirably, the water barrier layer 22 is formed of a material, for example a hydrophobic synthetic polymer, that resists reaction with, or degradation by, active element 23 and especially by an aqueous component thereof, should such component be present. It will be understood that such resistance should be effective for the intended life of a particular freeze indicator which could be days, weeks, months or years. Other liquids if present in indicator 23, can be similarly contained by suitable materials.

An additional useful function that can be served by water barrier layer 22 is that of heat-sealing. When formed of a suitable material, water barrier layer 22 can be effectively sealed with another component or components of freeze indicator 10, in the vicinity of peripheral flange 20, or at another suitable location to provide a complete or partial sealed envelope around indicator element 23. Suitable materials for water barrier layer 22 capable of performing both water resistant and heat sealing functions include heat-sealable materials such as, for example, polyolefins, amorphous polyesters and other materials that will be known or become known to those skilled in the art. Different active elements 23 may be utilized with different barrier layers 22 to perform corresponding functions, as will be apparent to those skilled in the art.

If desired, water barrier layer 22 can have an appearance which provides a contrasting visual background to active indicator element 23, facilitating viewing of the active element and reading of the indicator. For example, employing a relatively dark indicator element 23, such as a dispersion of particles of carbon black, water barrier layer 22 can be light or brightly colored. Alternatively, water barrier layer 22 can present a relatively dark or deeply colored background to the visual appearance of indicator bubble 18, if desired.

To present another appearance option, an additional colored or otherwise visually active layer or coating can be provided on the "upper" viewer-oriented surface of water barrier layer 22.

Substrate vapor block layer 24 serves to prevent downward migration of vapor and consequent vapor loss from indicator bubble 18. Vapor block layer 24 can comprise a metallic foil or film, for example, of aluminum, or other suitable water-vapor blocking material. If desired, substrate vapor block layer 24 can be vapor deposited on substrate 12 or water barrier layer 22. Alternatively, if desired, water barrier layer 22 can comprise a film or a coating, on a structural barrier layer or possibly on carrier substrate 12, of a suitable organic polymeric or silicone water sealing material, some examples of which are further described below. One such example is an aluminum layer or coating. Alternatively, a transparent vapor block material such as is described below in connection with indicator bubble 18 can be employed.

Substrate vapor block layer 24 can have any suitable construction, for example it can be a separate element that is assembled with substrate 12 and water barrier layer 22 or it can, as suggested, be a coating or film deposited on either the upper or lower surface of either component. Substrate vapor block layer 24 can, if desired, be a wall portion of an envelope or pouch that also extends around indicator bubble 18, if desired.

If desired, substrate 12, water barrier layer 22 and substrate vapor block layer 24 can be preassembled as a laminate or composite material providing the desired functionality of the several individual layers, as a composite whole. Thus, for example, vapor block layer 24, can be a relatively sturdy aluminum layer which may be adhered to, and contribute structural stability to, carrier substrate 12.

In one useful embodiment of the invention water barrier layer 22 and vapor block layer 24 can be furnished as a composite, bi-layer or laminate material, for example a lidding foil comprising an aluminum foil layer or coating on a heat-sealable film. The aluminum layer or coating can provide the desired vapor blocking function and serve as vapor block layer 24. If desired, layers above the aluminum layer or coating can be transparent, so that the aluminum layer provides a reflective, silver background to active indicator 23.

Some useful examples of suitable materials for the heat-sealable film component of such a composite bi-layer film include polyvinyl chloride, polyvinylidene chloride, polyolefins, polyethylene, polypropylene and polyesters such as polyethylene terephthalate. Other examples will be known to those skilled in the art. If desired, one or both surfaces of the lidding foil can be lacquered. One supplier of lidding foils useful in the practice of the invention is Tekni-Plex, Inc., Somerville, N.J. An example of a useful aluminum lidding foil material available from Tekni-Plex Inc. TEKNILID (trademark) 1252 which is described by the supplier as an overlacquer/aluminum/heatseal-lacquer based on polyvinyl chloride, polyvinylidene chloride.

Again referring to FIGS. 1-2, the embodiment of indicator bubble 18 shown has an upper structure comprising a clear, or partially clear, dome-shaped outer wall 29 which can be fabricated in multiple layers to serve a variety of functions.

In one embodiment of the invention, outer wall 29 has a multi-layer configuration comprising an outer layer 28, a thermoformable inner layer 32 and a further vapor block member in the form of a transparent vapor block layer 30. Outer layer 28 is exposed to the ambient environment of freeze indicator 10 while inner layer 32 defines, with substrate 12, indicator volume 34 within which active indicator 23 can be contained.

Transparent vapor block layer 30 can be sandwiched between inner layer 32 and outer layer 28, if desired. Alternatively, transparent vapor block layer 30 can be disposed inside inner layer 32 or outside outermost layer 28. For example, transparent vapor block layer 30 can be formed as a film or coating on either outer layer 28 or on inner layer 32. The film or coating can be formed in any desired manner, for example by vapor deposition under vacuum or other suitable method.

Desirably, outer wall 29 provides a viewing window for viewing active indicator 23 in indicator volume 34. Toward this end, the several layers constituting outer wall 29 can be light transmissive or can include a light-transmissive layer. Alternatively, the whole of the outer wall of indicator bubble 18 need not be light-transmissive. A light-transmitting window of smaller extent than the dome may be provided, with the remainder of the dome being opaque, if desired.

Outer wall 29 desirably is sufficiently light-transmissive, for example, transparent or translucent, considering all of its layers together, to permit significant changes in the reflectivity of the interior of indicator bubble 18 to be monitored externally by the human eye or by an optical reader device. Such monitoring may, for example, be effected at distances of from about 0.2 m to about 3 m. However, freeze indicator 10 can have visual characteristics that permit closer or longer range monitoring, if desired.

In one embodiment of the invention, active indicator 23 entirely fills indicator volume 34. In another embodiment, active indicator 23 does not entirely fill indicator volume 34 but a small visible air or other gaseous bubble 36 is provided in indicator volume 34. Bubble 36 will readily move to indicate the presence of a liquid medium in the dome. Such a bubble, which can for example have a diameter in the range of from about 5 to about 30% of the dome diameter or other large dimension, also serves as a freeze indicator, giving a clear indication, by movement of the host product, that the active indicator is solid when same is frozen. Such an indication can be useful for active indicators that provide a relatively subtle indication of freezing, which may become more pronounced on thawing.

In another embodiment of the invention, freeze indicator 10 comprises an indicator bubble 18 having curved or domed portions formed, for example by molding, from a substrate material, which material may be opaque. Polyurethane foam or the like of suitable thickness, for example 2 mil (0.002 inches or about 0.05 mm), can be employed as the substrate material, if desired in which the curved portions of bubble 18 are formed as a depression. The curved or domed portions of bubble 18 can be covered by a flat or clear or other light-transmissive window, through which the freeze-indicating signal is viewed. The dome and flat clear window define between them an indicator volume within the dome for receiving an indicator dispersion. If desired, the indicator volume can be partially or entirely enveloped in a suitable vapor block material or materials, as described herein.

Embodiments of the invention employing aqueous dispersions that are free of organic liquids, and particularly of volatile organics as components of active indicator element 23 can be beneficial in facilitating choice of a suitable material or structure for vapor block layer 30.

If desired, the extent of transparent vapor block layer 30 can be confined to areas outside peripheral flange 20 to facilitate heat sealing of flange 20, as will be described in more detail below.

Thermoformable inner layer 32 can be a structural layer giving form to outer wall 29 of indicator bubble 18. Alternatively, such structural form can be provided by outer layer 28 and/or transparent vapor block layer 30. In one embodiment, inner layer 32 can comprise or be constituted by, a thermoformable material which can be heat sealed at peripheral flange 20 to water barrier layer 22, or other suitable layer. Inner layer 32 can maintain the desired shape, optionally with moderate flexibility, and can support any other layers of which outer wall 28 may be composed.

The outer surface of outer layer 28 can be scratch resistant or have a scratch-resistant coating to protect indicator bubble 18 from damage during normal handling and contact with other objects. In addition, or alternatively, the outer surface of outer layer 28 can be treated, or constituted, to be printable, which is to say capable of receiving and displaying printed matter.

In another embodiment, the invention employs known laminate or composite materials to fulfill several of the functions provided individually by outer layer 28, substrate vapor block layer 24 and an inner layer. For example, composite packaging films employed as vapor barrier packaging for medications formulated as pills, tablets or the like, may have suitable properties for employment in the practice of the invention as may be determined from the manufacturer's specifications, by simple experimentation, or by other suitable means.

In one embodiment of the invention, active indicator element 23 is entirely contained within a vapor blocking envelope to prevent water vapor loss. The vapor blocking envelope can be provided entirely, substantially entirely or partially by vapor block layer 24 and vapor block layer 30. In another embodiment of the invention (not shown), the envelope is a self-contained, clear or transparent sealed sac of flexible or rigid vapor block material containing the indicator dispersion, in the manner of a small ampoule. If desired, such sacs or ampoules of indicator dispersion can be prefabricated and then assembled with substrate 12 and other desired components of freeze indicator 10.

Pursuant to a further embodiment of the invention, a drop or aliquot of indicator dispersion is encapsulated in a clear, flexible sac of vapor block material. Usefully, a small air or gas bubble can be included in the sealed sac or ampoule to help indicate a liquid condition of the contents.

In a still further embodiment of the invention, the indicator dispersion can be microencapsulated to provide, for each freeze indicator unit, a flat array of miniature bubbles each containing a coagulatable dispersion. Such an indicator array can be curved to fit a host product, if desired and can be suitable for printing or for other continuous web or sheet fed mass production.

The liquids and liquid vapors contained by such measures may be water or aqueous liquids and vapors or derived therefrom. Other liquids or solvents and their vapors, if employed in active indicator element 23, can be similarly contained and retained, if desired, employing appropriate vapor blocking materials. The particular vapor blocking material employed can be selected according to the nature of the liquid and its vapor, to provide sufficient containment to avoid poor performance during the intended useful life of the freeze indicator.

The shelf life before use of freeze indicator 10 can be prolonged as desired, to be for example, one year, two years, several years or an indefinite period, by sealing the indicator in a protective pouch or sheath of aluminum foil or other suitable material to prevent vapor loss. The protective pouch or sheath can be removed prior to application of indicator 10 to a host product or association of indicator 10 therewith, or prior to the reading of the indicator response.

The material employed for vapor block layer 30 can be selected to avoid unsatisfactory loss of water or other dispersion phase components during the intended life of the freeze indicator. As stated above, undue loss of the dispersion phase or medium may result in a poor quality signal or a confusing signal of a freeze exposure event, or even no signal. In one embodiment of the invention, vapor block layer 30 is a material, a laminate, a composite or the like, which permits a water vapor or moisture transmission rate of no more than about 1.0 g/m$^2$/day at a temperature of 38° C. (100° F.) and a relative humidity of 90%. In another embodiment, the water vapor transmission rate at a temperature of 38° C. (100° F.) is no more than about 0.50 g/m$^2$/day and a relative humidity of 90%. Materials that provide lower rates can be employed if desired, for example water vapor transmission rate of no more than about 0.1 g/m$^2$/day.

The vapor block material can be useful for many of the purposes of the invention if its vapor blocking properties are such that not more than about 20 percent by weight, or more desirably, 10 percent by weight of the water or other indicator liquid lost in one year of normal or standardized shelf life. Where a longer shelf life is desired, superior water vapor control may be utilized, for example so that not more than about 20 percent by weight or more desirably, 10 percent by weight of the water is lost in two, three or more years of normal or standardized shelf life. "Shelf life" references the indicator life while exposed to ambient conditions, for example, after attachment to a host product.

The invention includes embodiments wherein substrate vapor block layer 24 meets the foregoing vapor control requirements described for transparent vapor block layer 30. Since, for many embodiments of the invention, substrate vapor block layer 24 can be opaque, a suitably thick layer of aluminum or other opaque material can be employed for vapor block layer 24 to provide good control of vapor loss.

Many useful transparent vapor-blocking materials will be apparent to those skilled in the art in light of the teaching herein and include composite materials. Some suitable materials include, but are not limited to synthetic organic polymeric materials or silicone or organosilicone polymeric materials, as are known or as may become known to those skilled in the art. Monolayer films or multilayer laminates can be used. Useful multilayer laminates can comprise a structural synthetic polymer film and a vapor-blocking synthetic polymer film. In general, suitable multilayer materials may have lower water vapor transmission rates, but may be more expensive. Some examples of some useful transparent vapor-blocking materials include: clear water-sealing polyurethane, which can be applied as a coating, like a wood-floor sealing material, bilayer laminates of polyvinyl chloride and polychlorotrifluoroethylene, trilayer laminates of polyvinyl chloride, polyethylene and polychlorotrifluoroethylene, glycolised polyethylene terephthalate ("PETG"), polychlorotrifluoroethylene ("PCTFE"), bilayer laminations of PETG and PCTFE and of polyvinyl chloride with PCTFE or with another suitable barrier film material, ethylene-vinyl alcohol copolymer ("EVOH") and trilayer laminations of PETG, PCTFE and EVOH.

Some materials useful for fabricating transparent water vapor barrier 30 include rigid or flexible blister packaging moisture barrier films such as are available from Tekni-Plex, Inc. One example is a bilayer laminate of polyvinyl chloride and polychlorotrifluoroethylene such as that supplied under the trademark ACLAR® 22, by Honeywell International Inc. Another example is TEKNIFLEX (trademark)VPA 760 supplied by Tekni-Plex, Somerville, N.J., and described as a laminate consisting of two layers, a 7.5 mil layer of PVC and a 0.6 mil layer of PCTFE. The moisture vapor transmission rate of this material is described by the supplier as 0.025 gram per 100 square inches per 24 hours. A further material, from the same supplier is TEKNIFLEX (trademark) VPA 10300, described as a laminate consisting of 3 layers: a 10 mil layer of PVC, a 2 mil layer of PE and a 3 mil layer of PCTFE. The moisture vapor transmission rate of this material is described by the supplier as 0.005 gram per 100 square inches per 24 hours.

In some embodiments the invention can employ for mass production of freeze indicators, preformed arrays of blisters, for example of 15 mm diameter, such as are supplied by Tekni-Plex, Inc. for purposes such as lozenge or tablet packaging.

Some other suitable transparent water vapor barrier materials can include polymerizable organosilicone monomers, for example, trimethoxy silanes, including alkyl and lower-alkyl substituted silanes, which provide tenacious hydrophobic coatings on curing. To this and the indicator fabrication process can, if desired, include a vapor block curing step at a moderate temperature of, for example, about 60-120° C., in which case the substrate coating material is selected to withstand the moderate curing temperature, as may suitable polyesters.

In some alternative embodiments of the invention, a thin deposited film of a metal or metals can serve as, or be components of transparent vapor block layer 30. The deposited metal can, for example, be aluminum or other suitable metal. The thickness of the deposited metal film can be selected to provide a balance between adequate blocking of water vapor or other liquid vapor for the intended life of the freeze indicator and transmission of adequate light.

Other embodiments of the invention can employ other materials for transparent vapor block layer 30. For example, vapor block layer 30 can comprise a deposited, or other film, layer or coating of a transparent ceramic material, such as, indium tin oxide or silicon dioxide, or the like, or combinations or composites of such materials. Some useful ceramic layer products are available from Sheldahl, Northfield, Minn. Because ceramic materials may be brittle, if vapor block layer 30 has a curved of shaped configuration, a ceramic deposit, can be made on to a pre-shaped component, for example, on to a concave inner surface of outer layer 28 or on to the convex outer surface of an inner layer. In this way, possible post-shaping of a brittle ceramic layer can be avoided.

Figure 3:
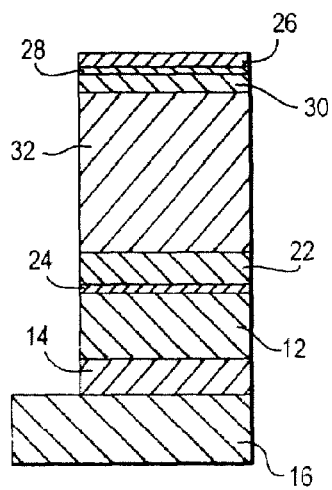
FIG. 3 is a schematic partial cross-sectional view on the line 2-2 of FIG. 1, scaled to show relative dimensions of the component layers in one exemplary embodiment of the freeze indicator there shown.

Referring now to FIG. 3, the various component layers of freeze indicator 10 may have any suitable dimensions appropriate for fulfilling the functions described herein. It will be understood that the dimensions may be varied according to a particular end product application, or host product to be monitored, and other factors. The X-Y dimensions of freeze indicator 10 in the horizontal plane perpendicular to the plane of the paper in FIG. 1 can largely be determined by the desired size and shape of a particular freeze indicator 10 which may in turn be determined by the intended application.

One example of possible Z-direction dimensions, perpendicular to the X-Y plane, or vertically on the page as illustrated in FIG. 3, will now be described. The to-be-described dimensions can be employed for a freeze indicator 10 having dimensions of for example 10 mm across and an indicator volume 34 of for example 10 or 20 μL and are given in units of mils, a mil being one-thousandth of an inch or about 0.025 mm. Reading upwardly in FIG. 3, releasable liner 16 can be from about 0.25 to about 25 mil thick, for example about 2.5 mil thick. Adhesive layer 14 can be from about 0.1 to about 10 mil thick, for example about 1 mil thick. Carrier substrate 12 can be from about 0.2 to about 20 mil thick, for example about 2 mil thick. Substrate vapor block layer 24 can be from about 0.002 to about 0.2 mil thick, for example about 0.02 mil thick. Water barrier layer 22 can be from about 0.1 to about 10 mil thick, for example about 1 mil thick.

Thermoformable inner layer 32 can be from about 0.6 to about 60 mil thick, for example about 6 mil thick. Transparent vapor block layer 30 can be from about 0.02 to about 2 mil thick, for example about 0.2 mil thick. Outer layer 28 can be from about 0.03 to about 3 mil thick, for example about 0.3 mil thick. Peripheral ring 26 can be from about 0.03 to about 3 mil thick, for example about 0.3 mil thick. Other suitable dimensions will be, or will become, apparent in light of this disclosure. These various dimensions are merely illustrative. Other possible dimensions will be apparent to those skilled in the art.

The various layers described can be clamped or pressed together in the vicinity of flange 20 to provide a water- and vapor-tight seal which desirably extends in a closed loop entirely around indicator volume 34. If desired, the seal can be effected by heat and/or use of an adhesive or by other suitable means. For example, a pressure-sensitive adhesive can be employed to seal thermoformable inner layer 32 to water barrier layer 22.

The materials of the several layers of the indicator can be selected to be mutually adherent or heat sealable one to another, in the vicinity of flange 20 or adhesive may be employed to join each layer to its vertical neighbor. Alternatively, or additionally, mechanical means such as clamps, rivets or the like may be employed to secure the several layers together. One or another of the foregoing, or a combination of same, may be employed to give freeze indicator 10 structural integrity.

Freeze indicator 10 can comprise or be constituted partially or entirely of commercially provided film materials that are available in roll or sheet stock, for low cost fabrication. Such a freeze indicator can be embodied as a small unit which provides a distinct visual signal. The control of vapor loss provided by employment of substrate vapor block layer 24 and transparent vapor block layer 30 helps prevent drying out of the active indicator element, promoting consistency and clarity of the visual signal provided by freeze indicator 10.

In vertical cross-section, as shown in FIG. 1, indicator bubble 18 defines an interior volume 34 comprising a segment of a circle. Outer wall 29 is essentially part-circular, while substrate 12, and the layers above it, provide a flat floor to indicator bubble 18. Other cross-sectional shapes especially those naturally provided by fluid pressure within domes or other volumes of various configurations may also be utilized.

Indicator bubble 18 may have any desired peripheral shape in plan view for example circular, oval, angular, square, rectangular, triangular, polygonal, hexagonal and strip-like. Angular shapes of indicator bubble 18 can be embodied in configurations having rounded or curved angles to accommodate construction of freeze indicators from unitary films, sheets or the like. The peripheral configuration of the freeze indicator, in plan view, can be similar to that of indicator bubble 18, or may be quite different. The illustrated embodiment of freeze indicator 10 will be further described with reference to the particular useful example of a circular plan shape of the freeze indicator and indicator bubble 18, with the understanding that other shapes may be employed, if desired.

Active element 23 can be any effective liquid composition, dispersion, or other element which undergoes a distinct and irreversible change in appearance after being subjected to a freezing temperature followed by thawing. The appearance change may be brought about by crystallization of water or other liquid present in the active element, or in other suitable manner, and may be observed by a human observer or read optically.

As described above, a useful visual change can be provided by employing a dispersion of an opaque solid particulate material in a liquid medium, for example, an aqueous liquid medium. The liquid medium usefully can consist only or essentially of water or an aqueous mixture as the sole liquid component of the liquid medium. Solutes can also be present, as described herein or as will be apparent to those skilled in the art. The liquid medium can be free of organic liquids especially non-polar volatile liquids. However, in some cases, a polar organic solvent such as an alcohol, for example ethyl alcohol, optionally in an azeotropic mixture with water, may be employed to depress the freezing point, if desired. Liquids miscible with water and which do not separate from the water or aqueous phase under the conditions of use of freeze indicator 10 can be employed. Some embodiments of the invention employ liquid aqueous mixtures which remain as a single phase before, during and after freezing.

Pursuant to the invention, a useful proportion of deuterium oxide and/or deuterated water can be included in the water employed in the liquid medium. Deuterium oxide can be helpful in raising the freezing point of an aqueous liquid medium. Furthermore, deuterium oxide can be helpful in providing a faster response at a given freezing temperature. For example, a proportion of deuterium oxide in the water component of the liquid medium, if water is present, of from about 10 to about 70 percent by weight of the water can be employed. If desired the proportion can be from about 20 to about 50 percent by weight of the water component of the liquid medium.

One example of active element 23 comprises a stable aqueous dispersion of ink or other opaque particles in water, or other aqueous medium, optionally a colloidal dispersion. The dispersed particles may have any suitable particle size and size distribution that can be stably dispersed. For example, the dispersed particles can have an average particle size of less than 10 micron, less than 1 micron or less than 100 nm.

The particles may comprise any suitable organic or inorganic pigment or lake, for example, carbon black, iron oxide or ultramarine. Many others are known to those skilled in the art and may be employed.

The dispersed solid phase can comprise a quite small proportion of the dispersion, for example, not more than about 5 percent by volume. One embodiment of the invention employs a proportion of pigment of not more than about 1 percent by volume. The proportion can be in the range of from about 0.1 to 1 percent by volume. If desired, higher proportions of solid particles up to about 10 percent by weight of the dispersion, or more, can be employed. Higher concentrations of solid can provide a more intense, or darker, visual appearance to freeze indicator 10 before freezing. Lower concentrations of solid can, in some cases, provide a more distinct visual change upon freezing.

If desired, a nucleating agent can be employed to help initiate coagulation of the dispersion and facilitate the obtaining of a consistent response to a defined temperature event. Water, for example, exhibits a precise melting point under standard conditions of 0° C. However, the freezing point in any given circumstance may be several degrees below zero owing to the well-known phenomenon of supercooling. Other liquids may behave similarly, to a greater or lesser degree. Use of a nucleating agent, for an aqueous liquid dispersion medium, an ice nucleating agent can help control the freezing point to be closer to the melting point of the liquid.

One embodiment of the invention utilizing an aqueous indicator dispersion employs a nucleating agent known to initiate freezing of water at a temperature near its freezing. Some examples of suitable nucleating agents include silver iodide crystals, cold-precipitated silver iodide/silver bromide mixtures, copper sulfide, ice-nucleating proteinaceous materials and other suitable ice or other nucleating agents, as known or as will become known to those skilled in the art. One example of an ice-nucleating proteinaceous material is a snow inducer product derived from the ice-nucleating active microorganisms *Pseudomonas syringae* under the trademark SNOMAX from York Snow (Victor, N.Y.).

The nucleating agent can be added in any effective nucleating quantity or proportion, for example in a proportion of from about 0.01 percent by weight of the indicator dispersion to about 1 percent by weight of the indicator dispersion for example from about 0.05 to about 0.1 percent by weight nucleating agent. As is known in the art, a given quantity of nucleating agent can seed different volumes of liquid. If desired, the amount of nucleating agent to be employed can be determined by routine experimentation.

If desired, freeze indicator 10 can include an ultraviolet-blocking layer or coating that is transparent to visible light overlying one or more of the transparent outer surfaces of freeze indicator 10. Such ultraviolet-blocking means can be useful to protect ultraviolet-sensitive components of freeze indicator 10 from possible damage or degradation, by ultraviolet light. Some examples of suitable ultraviolet-blocker technology can be found in U.S. Pat. Application Publication No. 2004/0253733 and the documents cited therein, the entire disclosure of which patent application publication is incorporated by reference.

Another example of a useful active element comprises a colloidal dispersion of an unreactive metal, or other unreactive inorganic mineral or material for example colloidal gold, colloidal silver, colloidal selenium or the like. Usefully, the dispersed material does not display reactivity adverse to the performance of the freeze indicator during the useful life of the freeze indicator.

Some further examples of materials that can be employed in particulate form include particles of a material selected from the group consisting of pigments, ink pigments, minerals, unreactive metals, noble metals, precious metals, gold, silver, aluminum, iridium, platinum, zinc, selenium, carbon black, sulfur, ferric oxide, kaolinite, montmorillonite, talc, halloysite, calcite (calcium carbonate), dolomite (calcium carbonate, magnesium carbonate), rutile titanium dioxide, gibbsite (aluminum hydroxide), zincite (zinc oxide), barite (barium sulfate) crystalline silica, amorphous silica, hydrated silica, fluorite (calcium fluoride), hydroxyapatite, white and colored polystyrene beads, white and colored plastic and synthetic polymeric particles, or a combination of any two or more of the foregoing materials comprising a coating of one material upon the other.

The dispersed inorganic pigment material is selected to be one providing an appearance change after freezing and thawing. A distinct appearance change is desirable. For example, 10 nm colloidal gold available from BB International Ltd, Cardiff, United Kingdom changes from red to blue-black on freezing and thawing and may be employed. Other colloidal gold sizes, for example 20, 50 and 200 nm can also exhibit distinct appearance changes, for example, from red to clear, and can be employed, if desired.

The colloidal solids can be generally spherical particles. In one embodiment, the colloidal solids can have a narrow particle size distribution with 90% or more of the particles having diameters within 10% of the average particle size.

Quite low concentrations of such colloidal minerals or other solids can be employed which may be in the range of from about 1 to about 500 or 1,000 parts per million ("ppm") which is to say about 0.0001 to about 0.05 or 0.1 percent, by weight. For example a concentration or proportion of solids in the colloid in the range of from about 10 to about 100 ppm by weight can be employed. The dispersions may be relatively pure dispersions of the elemental or other inorganic material in more or less pure water. In one embodiment of the invention, no other ingredients are present. Active indicator element 23 can consist of, or consist essentially of colloidal inorganic particles, for example gold particles, dispersed in water.

If desired, one or more dispersants, or dispersant aids may be employed to facilitate and maintain the stability of the dispersion, such as are known in the art. One example is hexametaphosphate. Generally, a solution of dispersant having a strength that is not more than about 0.1 molar will be satisfactory.

Some embodiments of the freeze indicator dispersion comprise, consist of, or consist essentially of, pigment, water and dispersant. Colorant, such as a dye, can be added to the aqueous dispersion medium. To facilitate control of vapor loss, organic solvents can be excluded, if desired.

In use, some embodiments of freeze indicator 10 can have an initial appearance such as an opaque gray, black, white, red, blue, yellow, green or other desired color which can be determined by suitable choice of pigment used in the dispersion. When frozen and then thawed, the stability of the dispersion is lost. The particles of the dispersion flocculate or agglomerate into visible beads, lumps or aggregates between which clear liquid becomes visible. Depending upon the optical characteristics of the liquid, a background may also become visible through the clear liquid. In such cases, the clear liquid appearance is provided by a subtractive color effect. For example, a blue background viewed through a yellow liquid can yield a green appearance to the viewer. Various useful visual combinations that can be employed will be apparent to those skilled in the art in light of this disclosure.

For example, a dispersion of carbon black in water and a white background layer provide a freeze indicator which initially has a continuous black appearance. Upon freezing, the carbon black particles coagulate into small black areas between which the white of the barrier layer shows through to a viewer as a pronounced mottling or mosaicking. Alternatively, a barrier layer or a background layer can be provided in a bright warning color such as red, orange or yellow which would command attention when viewed between the coagulated black particles.

A further striking color shift can be provided by employing a dispersion of blue particles in water made yellow through the use of one or more additives, the concentrations of colorant being selected to provide an initially uniform green appearance. Coagulation on freezing can yield a quite different appearance comprising curds of blue mottled with yellow.

In some cases, the intensity of the visual response is related to the concentration of solid pigment or other material in the dispersion, which consideration provides a further parameter that can be varied, selected or adjusted to provide a desired visual effect.

Thus, the invention can provide a freeze indicator with a flexible range of visual signaling options. The appearance change provided on freezing can be managed by appropriate selection of the respective appearances provided by the colors and reflectivities or absorbtivities, of the pigment component of active element 23, of the aqueous or other liquid phase of an active element and of the background appearance provided by a water barrier layer or an additional background color layer on or behind the water barrier layer, should same be employed.

Some non-limiting examples of the practice of the invention will now be described.

EXAMPLE 1

Colloids Changing Appearance on Freezing

Duplicate aliquots of approximately 0.5 ml each of five samples, numbered 1-5, of various colloidal mixtures, are placed into separate cups. The cups are thermoformed from clear 250 µm polymer film and each cup has a volume of about 0.8 ml. The cups are sealed with clear polymer tape. A small bubble is intentionally present in each sealed cup. One aliquot of each sample is placed into a freezer at −29° C. The other aliquot is left at room temperature. After the one aliquot of each sample has completely frozen it is removed, thawed and is visually compared with the other, duplicate aliquot that has remained at room temperature and never been frozen.

Colloidal mixtures having the following compositions are employed in preparing Samples 1-5:

Sample 1: Genflo 9771 latex (ca. 40% solids w/w), available from Omnova Performance Chemicals, Green Bay, Wis.

Sample 2: Aquaseal AS510G latex (ca. 40% solids w/w), available from Hunt Corp., Philadelphia, Pa.

Sample 3: 10 nm gold sol available from Ted Pella Inc., Redding, Calif.

Sample 4: 50 nm gold sol available from Ted Pella Inc., Redding, Calif.

Sample 5: 200 nm gold sol available from Ted Pella Inc., Redding, Calif.

Some observations obtainable are shown in Table 1 below:

TABLE 1

Comparison of Never Frozen Colloid Samples with Frozen-and-Thawed Colloid Samples

| Sample No | Never frozen | Frozen/Thawed |
|---|---|---|
| 1 | Creamy white liquid | White solid |
| 2 | Slightly yellow creamy liquid | Slightly brown solid |
| 3 | Pale red liquid | Pale blue-black liquid |
| 4 | Pale red liquid | Pale violet - colorless clear liquid |
| 5 | Slightly cloudy pale orange liquid | Colorless clear liquid |

In each case a distinct visual change occurs as a result of freezing and thawing. Colloidal compositions 1-5 are each suitable for incorporation as an active element in the inventive freeze indicator, for example, as active indicator element 23. Gold samples 3-5 provide a surprisingly distinct appearance change and demonstrate that gold colloids can be beneficially employed in a variety of different freeze indicators 10 with or without vapor block layers 24 and 30 or other vapor loss prevention means. Thus, gold colloids can be usefully employed in freeze indicators whose anticipated life is relatively short and also in freeze indicators that are expected to have a relatively long life including both shelf life and life associated with a host product.

EXAMPLE 2

Latex Colloids

A high solids (ca. 40% w/w) latex dispersion (Genflo 9771 latex obtained from Omnova Performance Chemicals, Green Bay, Wis.) is diluted to various levels with tap water to provide a number of test samples. Unfiltered, hard tap water from New Hope, Pa., believed to contain dissolved calcium salts, is utilized.

Duplicate aliquots of approximately 0.5 ml each of each sample of the diluted latex dispersion, are placed into separate cups. The cups are thermoformed from clear 250 µm polymer film and each cup has a volume of about 0.8 ml. The cups are sealed with clear polymer tape. A small bubble is intentionally present in each sealed cup. One aliquot of each sample is placed into a freezer at −20° C. The other aliquot is left at room temperature. After the one aliquot of each sample has completely frozen it is removed, thawed and is visually compared with the other, duplicate aliquot that has remained at room temperature and never been frozen.

Some results obtainable are shown in Table 2, below:

TABLE 2

Comparison of Never Frozen with Frozen-and-Thawed Diluted Latex Samples

| Latex Content (% w/w) | Never frozen | Frozen/Thawed |
|---|---|---|
| 40 | Creamy white liquid | White solid |
| 12 | Creamy white liquid | White solid |
| 4.0 | Milky white liquid | White solid |
| 1.6 | Cloudy white liquid | White curds in clear liquid |
| 0.4 | Cloudy white liquid | White curds in clear liquid |

In all cases there is a distinct difference between the frozen/thawed and the never frozen materials. Even at relatively low concentrations, for latex, of 1.6% or less, a distinct appearance change is obtained. The presence of clear liquid in the frozen-and-then thawed product can provide a useful means of displaying a distinctive, for example, highly colored background. The colloids of Example 2 can be employed as active elements in the freeze indicators of the invention.

The experimental procedures described in the following Control Examples C3-C5 and Examples 6-11 are intended to provide a meaningful simulation of the moisture loss performance of various indicator dispersions sealed into commercial blister packages, fabricated from a variety of barrier film materials.

CONTROL EXAMPLE C3:

Monolayer Polyvinylchloride Barrier Film/Distilled Water

A series of holes slightly greater than 15 mm in diameter is bored about 5 mm into a wooden block of dimensions 30 cm long by 10 cm wide by 2 cm deep. Individual blisters are cut from pre-formed arrays of 15 mm diameter blisters supplied by Tekni-Plex, Inc., using the wooden block as a support. The blister material employed in this control example is a 10 mil monolayer polyvinylchloride barrier film supplied by Tekni-Plex, Inc., under the trademark TEKNIFLEX VM 100. The moisture vapor transmission rate of the film is described by the supplier as 0.18 gram per 100 square inches per 24 hours. In cutting the blisters, care is taken to ensure there is at least 3 mm of flat film stock around the perimeter of each blister cavity. Indicator dispersions, described below, are added to each blister cavity. An aluminum lidding foil, available from Tekni-Plex, Inc., under the trademark TEKNILID 1252, and which is described by the manufacturer as an overlacquer/aluminum/-heatseal-lacquer based on polyvinyl chloride and polyvinylidene chloride is cut into 25×35 mm rectangles. One rectangle each is placed, heat seal side down, on the top of each blister.

A cylindrical aluminum block 25 mm tall and 19 mm in diameter, with a 15 mm diameter hole bored about 7 mm deep in one end, is heated with the hole end down on a laboratory stirrer hot plate set to have a surface temperature of approximately 170° C. The heated block is grasped with vise-grips, and aligned over the center of each supported blister and held in contact with the lidding foil, with modest manual pressure, for about 3 seconds. The aluminum block generates enough heat to seal the lidding foil to the blister, while the presence of the hole in the aluminum block prevents the contents of the blister from becoming overheated. The efficacy of the heat seal between the lidding foil and the blister is confirmed visually and then by pressing gently on the blister foil. The aluminum block is re-heated as necessary.

Three samples are prepared by adding 200 μL by volume of distilled water supplied by ACME Markets (www.acmemarkets.com) to each blister before sealing with lidding foil.

CONTROL EXAMPLE C4:

Monolayer Polyvinylchloride Barrier Film/Gold Colloid

Control Example C3 is repeated with the difference that the three samples are prepared by adding 1.0 mg by weight of silver iodide powder nucleating agent to the blister, using a spatula, and then dispensing 200 μL by volume of indicator dispersion into the blister. The indicator dispersion employed is an aqueous gold colloid derived from gold chloride and supplied under product code EM.GC40 by British BioCell International, (www.bbigold.com). This gold colloid product is an intense red color, as received and has a particle size of 40 nm, an optical density of 4.8 at 520 nm, and a gold colloid concentration of 0.04% by weight based on the weight of the gold as gold chloride, according to the supplier. The silver iodide employed is supplied by Sigma-Aldrich under product code 226823-25G.

CONTROL EXAMPLE C5

Monolayer Polyvinylchloride Barrier Film/Latex Dispersion

Control Example C4 is repeated with the difference that the indicator dispersion employed is OMNOVA 5176 latex supplied by OMNOVA Solutions Inc., (www.omnova.com), which is added to the blisters by pipette. The latex dispersion, as supplied, is diluted to a concentration of 3% with a solution containing 0.07% calcium chloride in distilled water (Acme Markets). The latex dispersion, as supplied by the manufacturer, is nominally 50% solids, so that the resultant the dispersion has a solids content of about 1.5% by weight. It has a white to light tan color. Concentrations are by weight based on the weight of the dispersion.

EXAMPLES 6-8

Three-layer Laminate Film

Control Examples C3-C5 are repeated with the difference that the blister arrays, supplied by Tekni-Films USA, are fabricated from a three-layer laminate film, product code Tekniflex™ VPA 10300, consisting of a 10 mil layer of polyvinyl chloride, a 2 mil layer of polyethylene and a 3 mil layer of polychlorotetrafluorethylene. The moisture vapor transmission rate of the film, as described by the supplier, is 0.005 gram per 100 square inches per 24 hours.

EXAMPLES 7-9

Two-layer Laminate Film

Examples 7-9 are repeated with the difference that the laminate film, is a two-layer film, product code Tekniflex™ VPA 760, consisting of a 7.5 mil layer of polyvinyl chloride and a 0.6 mil layer of polychlorotetrafluoroethylene. The moisture vapor transmission rate of the film, as described by the supplier, is 0.025 gram per 100 square inches per 24 hours.

Aging Test

The twenty-seven test samples prepared in Examples C3-C5 and Examples 6-11, three samples per example, are subjected to an aging test conducted at an elevated temperature to simulate possible water loss from the products that may occur during long-term storage at room or ambient temperatures, as a result of water vapor migration through the blister. Each of the freeze indicator blister samples is weighed to determine its weight in grams to 5 decimal places and then placed in an oven held at 65° C. for a period of six weeks. Heating above room temperature provides an accelerated aging process permitting testing to be performed within a shorter time frame than the desired shelf life which may be measured in months, for example 12 or 24 months or more. The samples are periodically removed from the oven re-weighed to assess water loss and replaced in the oven. Moisture loss is determined by subtraction. In each case, the starting weight of water is about 200 mg. Some results obtainable are shown in Table 3 below. In addition to determining weight loss, the samples are observed daily, recording changes in the appearance of the indicator dispersion such as a color change or an increase in viscosity.

TABLE 3

Aging Results

| Example | Film | Initial | 1 Day | 1 Week | 2 Week | 3 Week | 6 weeks |
|---|---|---|---|---|---|---|---|
| C3 | VM100 | 0 | 9 | 75 | 122 | 199 | Dry[1] |
| C4 | VM100 | 0 | 10 | 88 | 147 | 191 | Dry[1] |
| C5 | VM100 | 0 | 9 | 77 | 126 | 196 | Dry[1] |
| 6 | VPA 10300 | 0 | 1 | 5 | 9 | 19 | 36 |
| 7 | VPA 10300 | 0 | 1 | 6 | 9 | 21 | 43 |
| 8 | VPA 10300 | 0 | 1 | 5 | 9 | 20 | 35 |
| 9 | VPA 760 | 0 | 3 | 20 | 32 | 66 | 112 |
| 10 | VPA 760 | 0 | 2 | 19 | 31 | 65 | 110 |
| 11 | VPA 760 | 0 | 2 | 19 | 31 | 65 | 108 |

Water loss from blister in mg — Averages from triplicate samples

[1] As samples are dried out after 24 days, no further measurements are taken.

As may be seen from an inspection of the data in Table 3, the tested samples lose water at different rates when aged at 65° C.

A comparison of the blister samples of Examples 6 and 9, which only contain water, with those of Control Example C3, which also only contain water, shows the superior water vapor barrier characteristics, in this test system, of the tri-layer VPA 10300 film and the bi-layer VPA 760 film over the monolayer VM 100 control film. The samples of Control Example C3 lose water significantly more rapidly than do those of Examples 6 and 9. Thus, after 2 weeks about 60% of the water had been lost from the C3 samples compared to about a 4-5% loss from the samples of Example 6 and about a 16% loss from the samples of Example 9. These results are consistent with the relative moisture vapor transmission rates quoted above: VPA 10300 had the lowest quoted moisture vapor transmission rate and the lowest actual water loss in this experiment.

A comparison of the blister samples of Examples 7 and 10, which contain EM.GC40 gold colloid, with those of Control Example C4, which also contains the EM.GC40 gold colloid, shows the superior water vapor barrier characteristics, in this test system, of the tri-layer VPA 10300 film and the bi-layer VPA 760 film over the monolayer VM 100 control film as materials for freeze indicators containing a gold colloid. With regard to appearance, (not described in Table 3), during the first 9 days at 65° C. no changes in appearance are noticed for any of the gold colloid samples. After 12 days at 65° C., the contents of C4 samples had changed from red to colorless liquid while samples from Examples 7 and 10 had not changed color. Comparison of sample weights showed that the total loss of color of C4 samples coincided with about 60% loss of water. As the test continued, samples of Examples 7 and 10 retained color long after the control samples C4 had failed. Eventually the samples of Examples 7 and 10 began to fade: after 24 days at 65° C. the samples of Example 7 are light pink in color while the samples of Example 10 are light purple in color. The water loss at this stage is about 10% for Example 5 samples and about 30% for Example 8 samples. It appears that the superior moisture barrier provided by films VPA 10300 and VPA 760 contributes to the retention of color by the samples of Examples 7 and 10 compared to the samples of Control Example C4 that fail after 12 days.

A comparison of the blister samples of Examples 8 and 11, which contain 3.0% OMNOVA 5176 latex, with those of Control Example C5, which also contain 3.0% OMNOVA 5176 latex, shows the superior water vapor barrier characteristics, in this test system, of the tri-layer VPA 10300 film and the bi-layer VPA 760 film over the monolayer VM 100 control film as materials for freeze indicators containing a latex dispersion. With regard to appearance, during the first 12 days at 65° C. there is merely a slight darkening in color of all samples from white or a light tan color to a medium tan color. While the control samples C5 lose water faster than the samples of Examples 5 and 8, all samples remain as free-flowing liquids. At 24 days the samples of Control Example C5 lose almost all their water and become dark tan-colored viscous semi-solids, while the samples of Examples 8 and 11 are still free-flowing, tan-colored liquids. After 6 weeks when the test terminates, the samples of Examples 8 and 11 are still free-flowing tan-colored liquids of similar appearance to the starting samples, while the control blisters of Example C5 contain no liquid and merely have a yellow-brown residue. It appears that the superior moisture barrier of films VPA 10300 and VPA 760 is responsible for the retention of physical appearance long after the control sample dries out.

EXAMPLE 12

Gold Colloid and Deuterium Oxide

Using a spatula, 0.0002 g of silver iodide powder, corresponding to a concentration of 0.05% by weight based on the resultant colloid, is added to each of ten 0.2 ml lidded plastic vials ("Thermowell tubes", Catalog Number 6571: Corning Inc.). 26.4 µL of intense red 40 nm gold colloid product code EM.GC40 as used in Control Example C4, and 13.6 µL of deuterium oxide (Sigma-Aldrich, www.sigmaaldrich.com) are added by pipette to each vial. Each of the resultant ten samples is sonicated for five seconds using a Bransonic 200 Ultrasonic Cleaner. After dilution with deuterium oxide, the red color of the gold colloid is slightly reduced but is still vividly apparent to the naked eye. The samples are placed in a propylene glycol/water bath at −2° C. and checked periodically for color change.

The samples all freeze within 10 minutes to form ice. The frozen sample vials all have a white to clear appearance. After returning the sample vials to room temperature, all are colorless. The difference in appearance between indicators before freezing (red) and after freezing (colorless) is striking.

Example 12 illustrates a useful embodiment of the invention wherein the gold colloid employed provides a strong visual color change. A rapid freezing response is obtained using a combination of 0.05% silver iodide as nucleating agent to increase the freezing rate, and 34% deuterium oxide to increase the freezing point compared to pure water. Percentages are by weight based on the weight of the colloid.

EXAMPLES 13-16

Gold Colloid and Deuterium Oxide at Different Concentrations

Example 12 is repeated with the difference that the gold colloid employed is the material supplied under product code EM.GC20 (British BioCell International, www.bbigold.com) having a particle size of 20 nm, an optical density of 2.2, and a gold colloid concentration 0.02% based on the weight as gold chloride. Also, the gold colloid and deuterium oxide are added by pipette to the sample vials at different ratios to give deuterium concentrations of 0%, 20%, 34% and 45% by volume, for Examples 13, 14, 15 and 16 respectively. In each case, the total sample volume is 40 μL. The examples are run in triplicate, 30 samples per example, as necessary and selectively tested at three different temperatures, as described below.

As shown in Table 4, groups of ten samples of selected ones of Examples 13-16 are immersed in a propylene glycol/water bath set at the three temperatures, namely 0° C., −1° C. and −2° C., i.e. at the melting point of water and at temperatures just below that. The samples are examined periodically. The samples designated "Change" freeze to give a white/clear solid at the test temperature and in all cases are colorless liquids after being removed from the bath and returned to room temperature. The samples designated "No Change" remained as pink/red liquids at the test temperature and after being returned to room temperature. Table 4 shows the number of samples observed to be in each category.

Table 4 shows that the time required for the tested gold colloid to respond to freezing temperatures, with visible color change attributable to coagulation of the sample, decreases with increasing concentrations of deuterium oxide. Example 13 contained no deuterium oxide and serves as a control. The Example 13 samples all show a relatively long response time of about 2 hours, even at −2° C. before they freeze. At −1° C. none of the Example 13 samples is frozen even after 6 hours and at 0° C. the Example 13 samples remain unfrozen after 3 days.

In contrast, the samples from Example 14, containing 20% deuterium oxide display significantly shorter response times: all ten samples change color after 10 minutes at −2° C.; at −1° C. half the samples freeze after 45 minutes and all are frozen after 1.5 hours. However, at 0° C. none of the samples freezes, even after 5.0 days exposure.

The samples from Example 15, containing 34% deuterium oxide also all change color after 10 minutes at −2° C. At −1° C. seven out of ten of these samples displays a freeze-indicating color change after only 10 minutes, and at 17 minutes all samples change color. At 0° C. some of the samples give a freeze indication after 120 minutes and seven out of ten of the samples has changed color after 150 minutes.

The samples from Example 16, containing 45% deuterium oxide all change color after only 55 minutes at 0° C. and are not tested at lower temperatures where it is to be expected, in light of the data shown in Table 4, that they will change color in just a few minutes at −1° C. or −2° C.

The Table 4 results show that the presence of deuterium oxide sensitizes the samples to freezing temperatures.

EXAMPLE 17

GC40 Gold Colloid Alone

40 μL of EM.GC40 gold colloid having an optical density of 4.8 is added by pipette to each of ten sample vials of the type described in Example 12. The EM.GC40 colloid is a

TABLE 4

Effect of Deuterium Oxide on Freezing Behavior of Samples from Examples 13-16

| Example | Concentration Deuterium Oxide | Time | −2° C. Change | −2° C. No Change | −1° C. Change | −1° C. No Change | 0° C. Change | 0° C. No Change |
|---|---|---|---|---|---|---|---|---|
| 13 | 0% | 10 Minutes | 0 | 10 | 0 | 10 | 0 | 10 |
| | | 1 Hour | 7 | 3 | 0 | 10 | 0 | 10 |
| | | 2 Hour | 10 | 0 | 0 | 10 | 0 | 10 |
| | | 6 Hours | NT | NT | 0 | 10 | 0 | 10 |
| | | 3 Days | NT | NT | NT | NT | 0 | 10 |
| 14 | 20% | 10 Min | 10 | 0 | 2 | 8 | 0 | 10 |
| | | 45 Min | NT | NT | 5 | 5 | 0 | 10 |
| | | 1 Hour | NT | NT | 7 | 3 | 0 | 10 |
| | | 1.5 Hours | NT | NT | 10 | 0 | 0 | 10 |
| | | 5.0 Days | NT | NT | NT | NT | 0 | 10 |
| 15 | 34% | 10 Min | 10 | 0 | 7 | 3 | 0 | 10 |
| | | 17 Min | NT | NT | 10 | 0 | 0 | 10 |
| | | 60 Min | NT | NT | NT | NT | 0 | 10 |
| | | 90 Min | NT | NT | NT | NT | 1 | 9 |
| | | 120 Min | NT | NT | NT | NT | 4 | 6 |
| | | 150 Min | NT | NT | NT | NT | 7 | 3 |
| 16 | 45% | 10 Min | NT | NT | NT | NT | 0 | 10 |
| | | 15 Min | NT | NT | NT | NT | 4 | 6 |
| | | 20 Min | NT | NT | NT | NT | 5 | 5 |
| | | 30 Min | NT | NT | NT | NT | 7 | 3 |
| | | 55 Min | NT | NT | NT | NT | 10 | 0 |

NT = Not Tested deep red color at room temperature. The vials are placed in a freezer for 30 minutes at −25° C.

The EM.GC40 gold colloid samples all freeze to form ice of a white-to-clear appearance and after being returned to room temperature all samples are colorless.

EXAMPLE 18

GC20 Gold Colloid Alone

Example 17 is repeated employing EM.GC20 gold colloid having an optical density of 2.2 in place of the EM.GC40 gold colloid used in Example 17. The EM.GC20 colloid is a pink/red color before freezing. A similar result is obtained.

EXAMPLE 19

Silver Colloid (Hot Tub(Trademark))

Example 17 is repeated employing an aqueous silver colloid, Hot Tub Silver supplied by Purest Colloids Inc (www.purestcolloids.com) in place of the EM.GC40 gold colloid used in Example 17. The aqueous silver colloid employed is a gray color before freezing. A substantially similar result is obtained with the difference that the samples after being returned to room temperature are almost colorless, with a faint gray tint.

EXAMPLE 20

Silver Colloid (MesoSilver (Trademark))

Example 17 is repeated employing an aqueous silver colloid, MesoSilver (trademark) supplied by Purest Colloids Inc (www.purestcolloids.com) in place of the EM.GC40 gold colloid used in Example 17. The aqueous silver colloid employed is a light gray color before freezing. Similar results are obtained.

EXAMPLE 21

Gold Colloid (MesoGold (Trademark))

Example 17 is repeated employing an aqueous gold colloid, MesoGold (trademark) supplied by Purest Colloids Inc (www.purestcolloids.com) in place of the EM.GC40 gold colloid used in Example 17. The aqueous gold colloid employed is a light pink color before freezing. A similar result is obtained.

Examples 17-21 compare the behavior in the test system of the gold colloids sourced from British BioCell International (Examples 17 and 18) to other commercially available metal colloid products. Examples 19-21 show that Hot Tub Silver, MesoSilver, and MesoGold all give an irreversible and distinct color change, visible to the naked eye, upon freezing. Accordingly, each appears suitable for use as a visually active colloidal indicator component of a freeze indicator according to the invention. The British BioCell International gold colloids, EM.GC40 and EM.GC20, employed in Examples 17 and 18, provide a particularly dramatic color change. The more subtle colors available from other colloids of relatively inert or noble metals, such as those employed in Examples 19-21, extend the range of visual options available. All these low-concentration metal colloids may be employed with white backgrounds, or backgrounds of other colors to provide one or more of a variety of different visual effects.

EXAMPLE 22

MesoSilver Silver Colloid and Deuterium Oxide 26.4 µL of MesoSilver silver colloid and 13.6 µL of deuterium oxide are added by pipette to each of ten Thermowell sample vials. Each sample is sonicated for five seconds using a Bransonic 200 ultrasonic cleaner. After dilution with deuterium oxide, the gray color of the silver colloid becomes lighter but is still apparent to the naked eye. The samples are placed in a water bath at −2° C. and checked periodically for color change.

After 18 hours the samples are not frozen and no color change is apparent. The sample vials are then placed in a freezer for 30 minutes at −25° C. The samples all freeze to form ice of a white-to-clear appearance, and after being returned to room temperature all are colorless.

EXAMPLE 23

MesoGold Gold Colloid and Deuterium Oxide

Example 22 is repeated except that MesoGold gold colloid is used in place of MesoSilver silver colloid. After dilution with deuterium oxide, the pink color is lighter but is still apparent to the naked eye. Similar results are obtained.

EXAMPLE 24

MesoSilver Silver Colloid, Deuterium Oxide and Silver Iodide

Example 22 is repeated except that 0.0002 g of silver iodide powder is also added to each sample vial. In this case, all ten samples freeze within ten minutes of exposure at −2° C., and after being returned to room temperature, all are colorless.

EXAMPLE 25

MesoGold, Gold Colloid Deuterium Oxide and Silver Iodide

Example 23 is repeated except that 0.0002 g of silver iodide powder is also added to each sample vial. In this case, all ten samples freeze within ten minutes of exposure at −2° C., and after being returned to room temperature, all are colorless.

Examples 22-25 illustrate that MesoGold gold colloid and MesoSilver silver colloid can also be formulated with deuterium oxide and, optionally, silver iodide, to provide quicker responses to freeze exposure than the colloid alone.

Pursuant to a further aspect of the invention, a freeze indicator dispersion suitable for use as active indicator 23 can employ a finely dispersed surface-charged pigment such as ferric oxide or other metal oxides or the like, by employing source of multivalent counter-ions to reduce the surface charge and thus reduce the stability of the dispersion. Example 26, below illustrates this aspect of the invention.

EXAMPLE 26

Preparation of Gerric Oxide Dispersion 23.0 g of distilled water is added to 0.25 g of dry ferric oxide powder, iron (III) oxide, 99% purity, average particle size 20-50 nm, obtained from Alpha Aesar, Ward Hill, Mass.) in a glass vessel. 2.0 g of about 10% ammonia solution is added and the vessel closed. The mixture is shaken vigorously, placed in an ultrasonic bath for 10 minutes, and then left to sit. It immediately coagulated. Some months later it is opened, a strong ammonia smell is noted, and the supernatant is poured off. It is replaced with a like volume of distilled water, the vessel closed and put into an ultrasonic bath for 5 minutes. The mix no longer coagulated. It had a mild ammonia odor. After sitting over night a small amount of material had settled out but the supernatant remained well dispersed. This is Dispersion I.

An aliquot of dispersion I is diluted to a concentration of about 1.0 µl with distilled water. It is well dispersed and does not coagulate on freezing. It is then heated to 65° C. for about 20 minutes while being exposed to air. On cooling there is no odor of ammonia. On freezing at −3.0° C. partial coagulation is visible. This is Dispersion II.

Aliquots of dispersion 1 are taken and small quantities of 0.20% or 0.020% calcium chloride solution in distilled water are added. The samples are mixed and allowed to sit. Samples prepared at 0.004% calcium chloride or greater coagulate but those at 0.002% or less do not. A larger sample of the dispersion is prepared at 0.002% calcium chloride. The sample remained dispersed overnight. This is Dispersion III.

Each sample of dispersions I-III is prepared for freeze testing in the following way: about 0.5 µg of silver iodide powder, an ice nucleating agent, is placed in the bottom of a 150 µl polyvinyl chloride blister and about 100 µl of dispersion added. The blister is sealed with 3M 3850 pressure sensitive adhesive tape. Freeze testing is conducted by immersion in an anti-freeze solution at −3.0° for 5 minutes. All samples are prepared and tested in triplicate.

It is seen that all samples freeze within 5 minutes. There is no apparent poisoning of the silver iodide that would cause it to become dysfunctional.

The appearances of the blisters containing samples without calcium chloride are slightly changed upon freezing in that they acquire a frozen look. However, the rust color of the oxide is still dispersed more or less uniformly through the blister. On thawing the mixture is well dispersed and indistinguishable from a comparable unfrozen blister. There is insufficient appearance change to be useful as an indicator and the change is not irreversible. Thus, the tested dispersion, without calcium chloride, is not suitable for use in a freeze indicator pursuant to the invention.

The appearances of the samples containing 0.002% calcium chloride is distinctly changed upon freezing. The intensity of the color is reduced and is concentrated in clusters toward the center of the blister. On thawing the colloid is coagulated and rapidly settles leaving a clear supernatant. These samples appear useful as the active component of a freeze indicator according to the invention. It is expected that similar results can be obtained with other multivalent cations or other insoluble inorganic powders.

As can be understood from Example 26, freeze indicator active element can employ finely dispersed ferric oxide by making the dispersion marginally stable with respect to the concentration of a source of multivalent counter-ions, in this case calcium ions, when this is included in the dispersion. Upon freezing, the concentration of counter ions increases, further neutralizing the surface charge on the dispersed particles, causing the dispersion to lose stability and coagulate.

It will be understood that, in addition to ferric oxide, many minerals and other particles, with simple ionizable surfaces when suspended in water can be similarly employed in the practice of the invention, using a suitable source of counter ions to partially neutralize the surface charge on the particles and provide a marginally stable dispersion.

The surface charge of the suspension can be adjusted to be relatively low so that it is not highly dispersed. This can be adjusted with an acid or base depending upon the nature of the surface charge. In example 26 ammonium hydroxide is used first to give the ferric oxide particles a high charge so that they can be well dispersed, and then by its removal to lower the charge.

In another aspect of the invention, a further experiment, such as is described in Example 27, can be performed to determine whether a heat-sealing step at elevated temperature can be avoided by employing a pressure-sensitive adhesive to bond a transparent indicator dome or bubble to a substrate layer.

EXAMPE 27

Use of Pressure Sensitive Adhesive to Seal a Blister-Pack Freeze Indicator

100 µl aliquots of gold colloid (BBI EM GC40) and 50 µl aliquots of a suspension of about 1% silver iodide (Sigma Aldrich) in distilled water are dispensed into 450 µl polyvinyl chloride blisters. One set of blister samples is heat sealed with TEKNILID (trademark) 1252 foil, which includes a heat-seal adhesive. Another set of blister samples is cold sealed using a pressure-sensitive adhesive tape, 3M Corp. product code 3280. The freezing characteristics of the two types of sample are compared by immersion in a chilled bath operating at −3.0° C. Both sets of samples freeze within 10 minutes and in all cases the contents change from pink to clear. When the samples are thawed and returned to room temperature, they remain clear. The test is repeated on samples maintained for one day at room temperature. Similar results are obtained. All samples show a good visual change upon freezing and the change is irreversible. They all appear useful as freeze indicator dispersions in the practice of the invention. The pressure sensitive adhesive employed does not appear to have contaminated the dispersion, in an undesirable manner, in this test.

If desired, miscible organics, organic mixtures, or silicone fluids or silicone fluid mixtures or other liquids or liquid mixtures can be used in place of water and can be selected to provide responses and indications of other desired temperature exposures. Suitable vapor barriers can be selected accordingly.

Various methods can be employed to mass produce freeze indicators according to the invention. For example, sheets or a web assembly of the upper layers of the indicator can be provided with the domes inverted and filled or partially filled with a liquid dispersion of an active element. The substrate layers can then be applied on top and clamped shut. Individual freeze indicators are then pressure- or heat-sealed in the vicinity of their peripheral flanges and cut or stamped from the sheet or web.

As may be understood from the foregoing description, the invention can provide, inter alia, a small, economical freeze indicator having a good shelf life, of for example at least six months, one year, two years or possibly even more. Toward such ends the invention can employ a high quality, well-controlled aqueous dispersion which responds consistently to given freeze conditions, providing a visual change of good intensity and/or contrast which is readily observed or read optically. Useful features which can be helpful in providing small units include use of a dilute aqueous dispersion, employment of vapor-loss control measures, and employment of active element that provides a good optical response to a freezing event.

Figure 4:
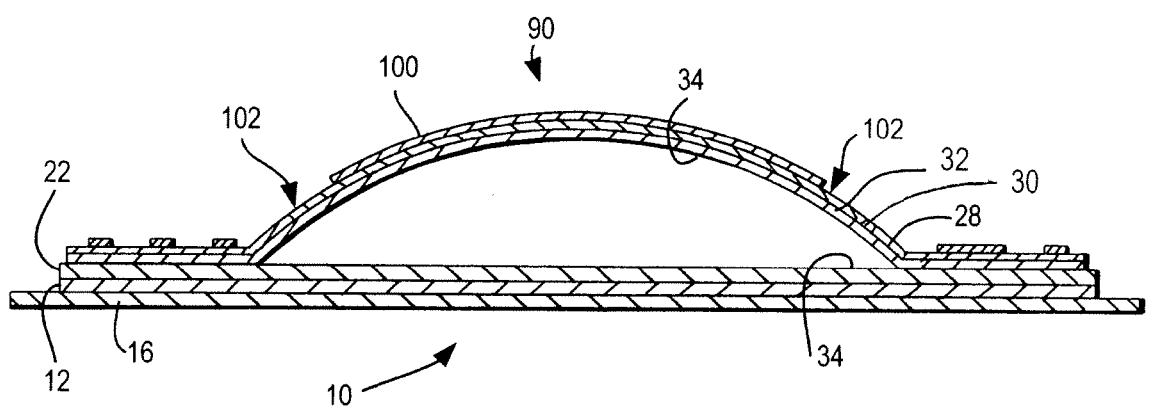
FIG. 4 is a schematic cross-sectional view similar to FIG. 1, of one embodiment of combination indicator according to the invention, which combination indicator comprises the freeze indicator shown in FIGS. 1-3.

Referring now to FIG. 4, the depicted combination indicator 90 includes as a major component, a freeze indicator 10 as shown in FIGS. 1-3. Freeze indicator 10 serves as a platform for, and supports, a cumulative ambient time-temperature indicator 100. Time-temperature indicator 100 can be applied to outer layer 28 of freeze indicator 10 in a suitable pattern and location, or may be supported on freeze indicator 10 in any other desired manner.

As shown in FIG. 4, time-temperature indicator 100 comprises a circular disk applied centrally to outer layer 28 of freeze indicator 10 leaving an unobstructed, ring-shaped zone 102 around time-temperature indicator 100 through which the appearance of freeze indicator active element 23 can be viewed. The resultant overall appearance of the indicator, as may be seen, when viewed from above in FIG. 4, is somewhat like a shooting or archery bull's-eye target, with time-temperature indicator 100 providing the bull's eye, and zone 102 and peripheral ring 26 of freeze indicator 10 providing inner and outer rings respectively around the bull's-eye.

A time-temperature indicator contains or comprises an active element which is cumulatively responsive to ambient temperatures and which displays a visual change when a predetermined integral of temperature exposure over time has been reached, as is known in the art. A time-temperature indicator may comprise an ink coating incorporating an active agent, such as a polymerizable diacetylenic monomer, or other suitable compound. Alternatively, a time-temperature indicator may comprise a substrate layer bearing an ink coating, where the substrate layer is suitably attached to outer wall of freeze indicator, for example, by an adhesive. A release layer may cover the adhesive prior to application of the time-temperature indicator to the dome outer wall.

In one exemplary embodiment, a time-temperature indicator is initially pink and may change to dark blue when its end point is reached. The response characteristics and end point of the time-temperature indicator are matched to the perishability or shelf life characteristics of the intended host product. The time-temperature indicator provides an observable or optically readable visual change which gives a meaningful indication of the temperature history of the host product. For example, the response indicators may indicate that a product is at or near the end of its useful life and should be used immediately, or possibly discarded.

In manufacturing a combination temperature-sensitive indicator, it is desirable to protect the freeze indicator from exposure to freezing temperatures prior to assembly of, or association with, a host product to prevent premature activation of same. A time-temperature indicator using a polymerizable polyacetylenic active agent desirably is maintained in cold storage prior to assembly or association with the host product, to prevent premature activation of same.

With these considerations in mind, the freeze indicator and the time-temperature indicator can be assembled, or associated, with a host product in any suitable manner and sequence. For example, a freeze indicator may be affixed to a host product at room temperature then a time-temperature indicator may be withdrawn from cold storage and affixed or otherwise associated with the host product, for example, by being adhered to the freeze indicator, as shown in FIG. 4. If desired, the time-temperature indicator can be brought to room or other appropriate temperature immediately before application to avoid unduly cooling freeze indicator and risking premature activation of same.

Another embodiment of the invention (not shown) comprises a single or integrated- signal combination freeze indicator. In this integrated signal embodiment, a visual signal from a freeze indicator and a visual signal from a time-temperature indicator are combined to be read as one. One embodiment of such an integrated combination indicator employs a time-temperature indicator which is transparent and which more or less completely covers the a transparent dome of a freeze indicator so that the time-temperature appearance is added to the dome appearance providing a single signal. The reflectivities of the indicators are subtractively mixed. In one embodiment, the time-temperature indicator and freeze indicator appearances are similar, giving a simple "either/or" signal: which is to say the indicator shows a dark or other "unacceptable" appearance if either undue freeze or heat exposure has occurred.

A further embodiment of the invention (not shown) employs a circular or dot indicator divided in two semi-circular halves, one half being a freeze indicator and the other half being a cumulative time-temperature indicator. A reference indicator can be employed if desired as a ring around the dots. The end point appearances of both indicators and the reference ring can be the same.

Shown in FIGS. 5-13 are three different arrangements of combination indicator employing different geometries yet providing an easily read, visually coherent design. Other arrangements employing different geometries and other structural features will be apparent to those skilled in the art. For example areas such as a triangle, circle, rectangular or square may be split between an indicator and its reference or between two indicators. In the latter case one or more reference areas may adjoin the perimeter of the geometric shape. The indicators could be realized in parallel strips or bars or other suitable graphic arrangements. Other color schemes to provide one or more clear signals to a viewer or optical reader may be utilized, as described and suggested herein.

FIGS. 5-7 show an inventive embodiment wherein the signals of a freeze indicator and a time-temperature indicator are combined centrally and the two indicators are surrounded by a single reference ring for the time-temperature indicator. FIGS. 8-13 show embodiments wherein two reference areas are employed: in the embodiment of FIGS. 8-10 a square time temperature indicator is central and a freeze indicator is provided in an outer ring whereas in FIGS. 11-13 a circular freeze indicator is central and a time temperature indicator is provided in an outer ring.

Referring now to FIGS. 5-7, the first modified version of combination freeze indicator 90 here illustrated comprises an outer time-temperature indicator reference ring 110 of intermediate visual intensity, a circular freeze indicator 112 which is initially light-colored, and a transparent, square time-temperature indicator 114 superposed on freeze indicator 112 to leave segments of freeze indicator 112 directly visible, as shown.

Outer reference ring 110 can, if desired, be an ink coating of suitable color on peripheral ring 26 matched to a desired end point for time-temperature indicator 114. Freeze indicator 112 can have any suitable structure which is initially light-colored and becomes dark when frozen. For example, a low-concentration latex dispersion combined with a colored background may have an initially milky white opaque appearance and may curdle when frozen to show the colored background to a viewer. Time-temperature indicator 14 can comprise a layer of an active ink transparent, ink-formulated, temperature-sensitive agent such for example as a polyacetylenic color-changing monomer, as is known in the art.

As shown in FIG. 5, initially, when fresh, both indicators 112 and 114 are light colored and reference ring 110 has a darker color. The freshness is apparent from the absence of significant darkening of the central area. In FIG. 6, time-temperature indicator 114 has darkened to match reference ring 110 indicating potential loss of freshness or heat abuse of an associated host product which should therefore be discarded. In FIG. 7, freeze indicator 112 has darkened, in this case to a greater degree than, or different color from, reference ring 110, indicating that the indicator has been frozen. Thus, the presence of a dark area in the middle of the indicator clearly signals undesired or unacceptable temperature exposure. The darkening of freeze indicator 112 combines with that of transparent time-temperature indicator 114 to provide a darker central square.

Referring now to FIGS. 8-10, the second modified version of combination freeze indicator 90 here illustrated comprises an outer freeze indicator reference ring 120 of intermediate visual intensity and a ring-shaped freeze indicator 122 adjacent reference ring 120 which indicator 122 is initially light-colored. Radially inwardly, combination indicator 90 further comprises a square time-temperature indicator 124, having an opaque white backing layer, surrounded by a time-temperature indicator reference area 126. In an alternative embodiment, not shown, time-temperature indicator 124 is initially transparent.

As may be seen from inspection of FIGS. 8-10, the presence of large dark circle, as in FIG. 9, indicating heat exposure, or a thick dark ring, as in FIG. 10, indicating freezing, indicates undesired temperature exposure has occurred and the host product should be handled accordingly.

Figure 11:
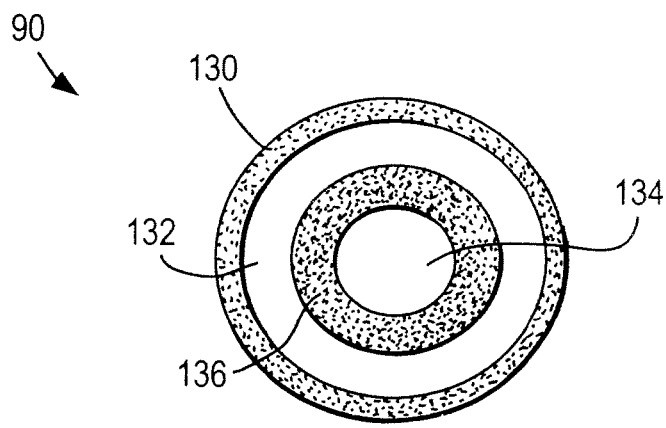
FIG. 11 is a top plan view of a second modified version of a combination freeze indicator such as that shown in FIG. 4 as it might appear when associated with a host product in fresh condition.
Figure 12:
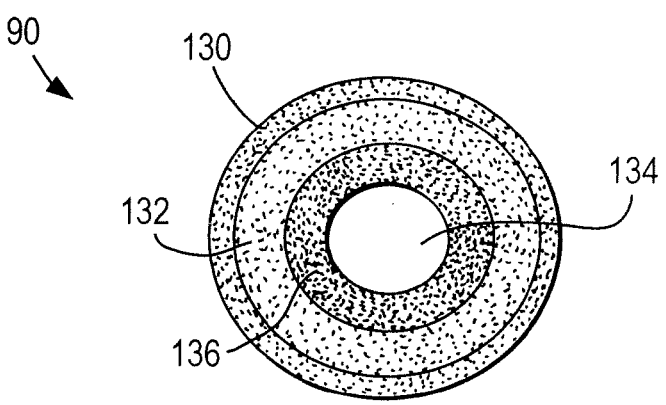
FIG. 12 is a view similar to FIG. 11 of the combination indicator shown in FIG. 5 as it might appear when the host product has been exposed to ambient heat.
Figure 13:
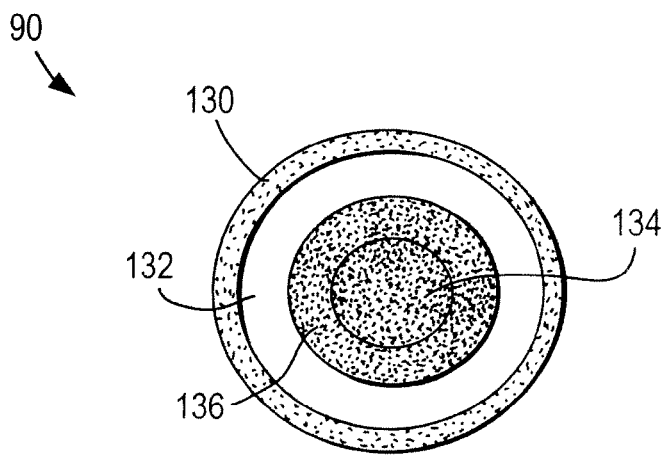
FIG. 13 is a view similar to FIG. 11 of the combination indicator shown in FIG. 5 as it might appear when frozen.

Referring now to FIGS. 11-13, the third modified version of combination freeze indicator 90 here illustrated comprises an outer time-temperature indicator reference ring 130 of intermediate visual intensity. Adjacent reference ring 130 is a ring-shaped time-temperature indicator 132 which indicator 132 is initially light-colored. Radially inwardly, freeze indicator 90 further comprises a circular freeze indicator 134 surrounded by a freeze indicator reference ring 136.

As may also be seen from inspection of FIGS. 11-13, the presence of large dark circle, as in FIG. 13, indicating freezing, or a thick dark ring, as in FIG. 12, indicating heat exposure, again indicates undesired temperature exposure has occurred and the host product should be handled accordingly.

In each of the modified embodiments of FIGS. 5-7, 8-10 and 11-13, the visual appearance of the freeze indicator, the time-temperature indicator and any background that may be displayed can be selected according to the teachings herein to obtain desired visual effects in a particular combination indicator, any reference area being colored or pigmented in an appropriate manner according to the intended end point.

As shown in FIGS. 14-17, the invention also provides a three-way combination temperature exposure indicator which can provide comprehensive indications of a host product's temperature exposure history. In particular, three-way combination indicators according to the invention can provide indications of cumulative past temperature exposure, exposure to freezing temperatures and exposure to a temperature above a threshold.

Figure 14:
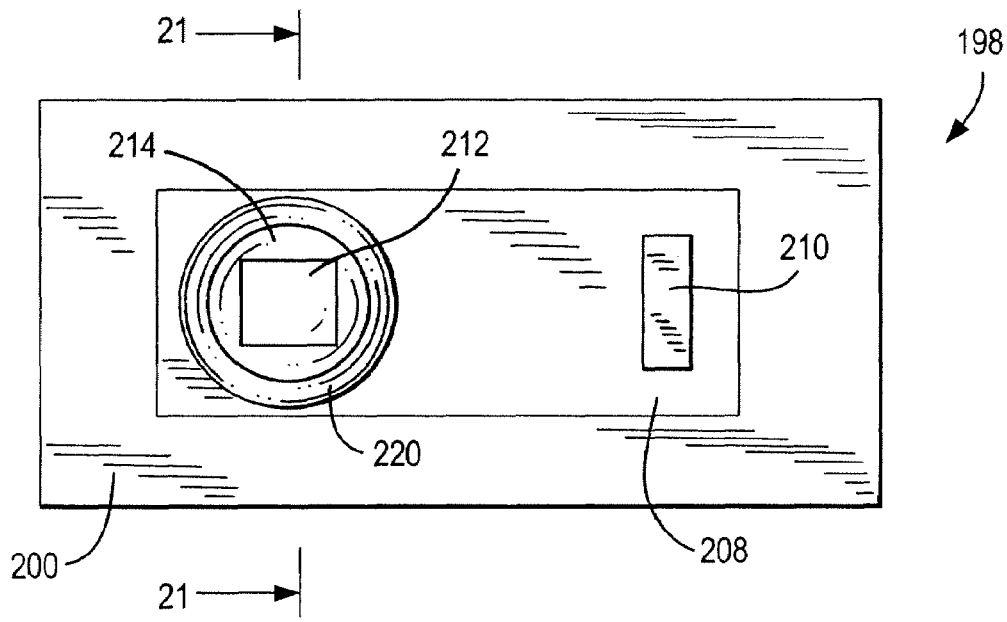
FIG. 14 is a schematic plan view of a first embodiment of a three-way combination temperature exposure indicator according to the invention.
Figure 15:
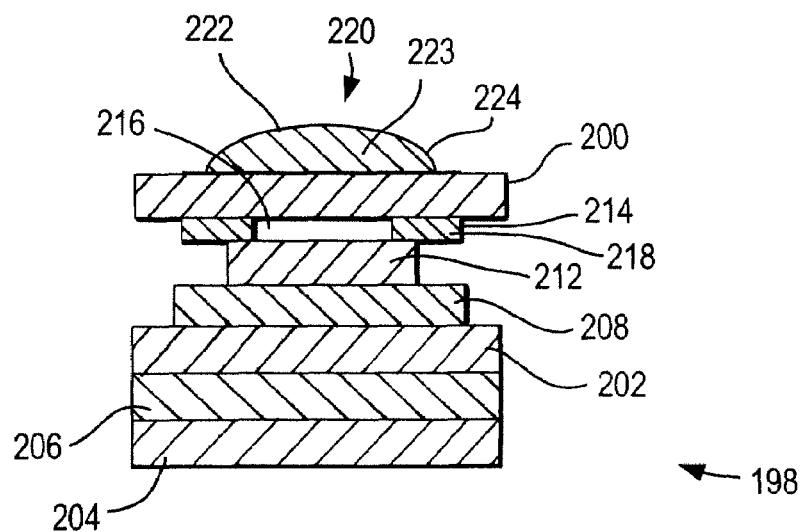
FIG. 15 is a cross-sectional view on the line 15-15 of FIG. 14.

Referring now to FIGS. 14 and 15, there is shown an embodiment of three-way combination temperature exposure indicator, referenced 198, which comprises an upper film member 200 and a lower film member 202 which can, if desired, both be structural members giving integrity to the indicator. "Upper" and "lower" refer to the orientation of the indicator as shown in FIGS. 14 and 15. As shown film members 200 and 202 and the indicator itself, have a generally elongated rectangular shape. Also, the vertical scale is exaggerated for clarity. It will be understood that film members 200 and 202 and the indicator can have any desired shape including circular, oval, triangular, irregular, fanciful and so on. Indicator 198 can be rigid or flexible. Furthermore, embodiments of indicator 198 can be quite thin in the vertical dimension and can have relatively small dimensions in keeping with some of the small embodiments of freeze indicator described herein. Still further, some embodiments of three-way combination exposure indicator 198 can be suitable for mass production by printing-like methods, by use of continuous web technology or by other suitable means.

Upper film member 200 desirably is either transparent or has a transparent window in the active indicator area and can be formed of any suitable material, for example a synthetic polymer such as polyethylene or polypropylene. Lower film member 202 can be formed of similar materials and can also be transparent. Lower film member 202 can alternatively be opaque and can be formed of metallic or paper film material or of a printed or otherwise coated transparent material.

Lower film member 202 can serve as a substrate, providing structural support to the indicator elements above it. A release liner 204 can be removably adhered to the lower surface of lower film member 202, by a layer of pressure-sensitive adhesive 206. Release liner 204 can be removed to permit the indicator to be attached to a host product or other suitable structure by adhesive 206. If desired, upper film member 20 can be attached to lower film member 202, for example by a peripheral seal, adhesive lamination or other suitable means, to provide a secure structure.

A white or light-colored porous wicking member 208 of lateral dimension somewhat less than those of lower film member 202 overlies lower film member 202. A reservoir of colored fusible material 210 is disposed toward one end of wicking member 208, the righthand end as viewed in FIG. 14. Colored fusible material 210 has an elevated melting point, for example in the range of about 20 to about 40° C. Wicking member 208 and fusible material 210 together comprise a temperature threshold indicator. After a relatively short period of exposure to a temperature above a threshold in the vicinity of the melting-point of colored fusible material 210 the material can melt and migrate along wicking member 208 generating visible darkening at the lefthand end of wicking member 208. Other useful configurations and technologies that can be employed for the threshold indicator will be apparent or become apparent to those skilled in the art. For example, threshold indicators or threshold indicator technology such as is described in Prusik et al. U.S. Pat. No. 5,709,472 and Smith et al. U.S. copending provisional patent Application No. 60/823,957, filed Aug. 30, 2006, can be employed. The disclosures of said patent and application are incorporated by reference herein.

A cumulative ambient temperature exposure indicator 212 having, for example, a square configuration as shown, is disposed toward the other, lefthand end of wicking member 208, as viewed in FIG. 14. Cumulative time-temperature indicator 212 responds to environmental temperature exposure with a visual change, for example gradually darkening over time in accordance with the integral of the time-temperature exposure. Desirably, cumulative time-temperature indicator 212 is initially light colored and sufficiently light transmissive that darkening of wicking member 208 caused by migration of melted fusible material 210 is visible, or readable, externally of the indicator.

Cumulative time-temperature indicator 212 can employ any active indicator element which will meet the purposes of the illustrated embodiment of the invention, and in particular, which can provide an irreversible change from an initial light-transmissive appearance to provide a visual signal of accumulating time-temperature exposure. As is known in the art, one suitable indicator element is a color-changing polymerizable diacetylenic monomer compound. A variety of suitable cumulative time-temperature elements that can be employed for cumulative time-temperature indicator 212 is available from Temptime Corporation, Morris Plains, N.J. Other suitable cumulative time-temperature elements that can be employed, as will be known to, or apparent to, or will become known to those skilled in the art in the light of this disclosure.

An optional reference ring 214 having a clear central viewing window 216 and a peripheral colored, or otherwise visually marked, ring portion 218 can be provided to help calibrate or interpret, the appearance of the three-way combination indicator. As shown, reference ring 214 is located between cumulative time-temperature indicator 212 and upper film 200. Other suitable locations will be apparent to those skilled in the art.

Supported on the upper surface of upper film 200, vertically aligned above cumulative time-temperature indicator is a freeze indicator 220. Freeze indicator 220 comprises a dome-like transparent blister 222, an active element 223 and a transparent substrate 224. Desirably, active element 223 is clear or light-transmissive before it is frozen and darkens irreversibly upon freezing. Active element 223 can be sufficiently light-transmissive that, considered with the transparency of substrate 224 and blister 222, color changes or darkening of cumulative time-temperature indicator 212 or wicking member 208, are visible to an external observer through freeze indicator 220. To the extent that it can meet the purposes of three-way combination temperature exposure indicator 198, freeze indicator 220 or active elements 223 can have constructions, or constitutions, such as are described for freeze indicator 10. Freeze indicator 220 need not be completely clear initially, so long as it transmits sufficient light to communicate the condition of the indicators below. For example freeze indicator 220 can employ an indicator dispersion that is initially a low intensity transparent red and which changes to blue upon freeze exposure. A gold colloid can be used for this purpose.

Alternatively, known active freeze indicator elements, or freeze indicator elements that become known, can be employed, as will be apparent to those skilled in the art. One example is disclosed in Manske U.S. Pat. No. 4,457,252, the disclosure of which is incorporated by reference herein. Manske describes use of a colorless organic compound in the freeze indicator. Another organic compound saturated with a dye and having a solidification temperature lower than that of the colorless compound and which is miscible with the colorless compound, is located in a capillary tube or the like communicating with the freeze indicator. Upon freeze or comparable exposure, the dye-saturated compound is transported into the freeze indicator and mixes with the colorless compound to provide a visual freeze indication.

In this example, as described above, reference ring 214 is dark. Cumulative time-temperature indicator 212 is initially light and slowly darkens with time. Fusible material 210 is also dark so that, if or when, the temperature to which the three-way combination indicator is exposed exceeds an upper threshold, fusible material 210 will spread along the wicking material, causing the portion of the wicking material viewed through freeze indicator 220 to change from light to dark. Freeze indicator 220 is transparent, and exhibits a clear or colorless freeze indicator material, active element 223, initially. If freeze indicator 220 is exposed to a freezing temperature, the freeze indicator material of active element 223 darkens.

Three-way combination indicator 198 gives a simple, easily read indication of whether the indicator, and any host product associated with it have been exposed to any of three different types of undesired temperature conditions. Uniquely, the three indications can all be read through a single viewing window provided by freeze indicator 220 itself.

As long as three-way combination indicator 198 displays a light square inside a darker circle, the host product can be used. If indicator 198 displays a dark area within reference ring 214, the host product may have been exposed to an undesired temperature condition and possibly should not be used, or its condition should be further checked before use. Thus, if combination indicator 198 is exposed to freezing conditions freeze indicator 220 will show as a dark circle. If the indicator is exposed to a temperature above the threshold, the fusible material 210 will darken the appearance of wick 208 as it is seen through cumulative time-temperature indicator 212 and central square viewing window 216. Square 216 will appear darker than the surrounding circle of reference ring 214. Finally, if the cumulative effects of time and temperature exceed predetermined limits, cumulative time-temperature indicator 212 viewed through window 216 will display a central square which is darker that the surrounding circle.

Figure 16:
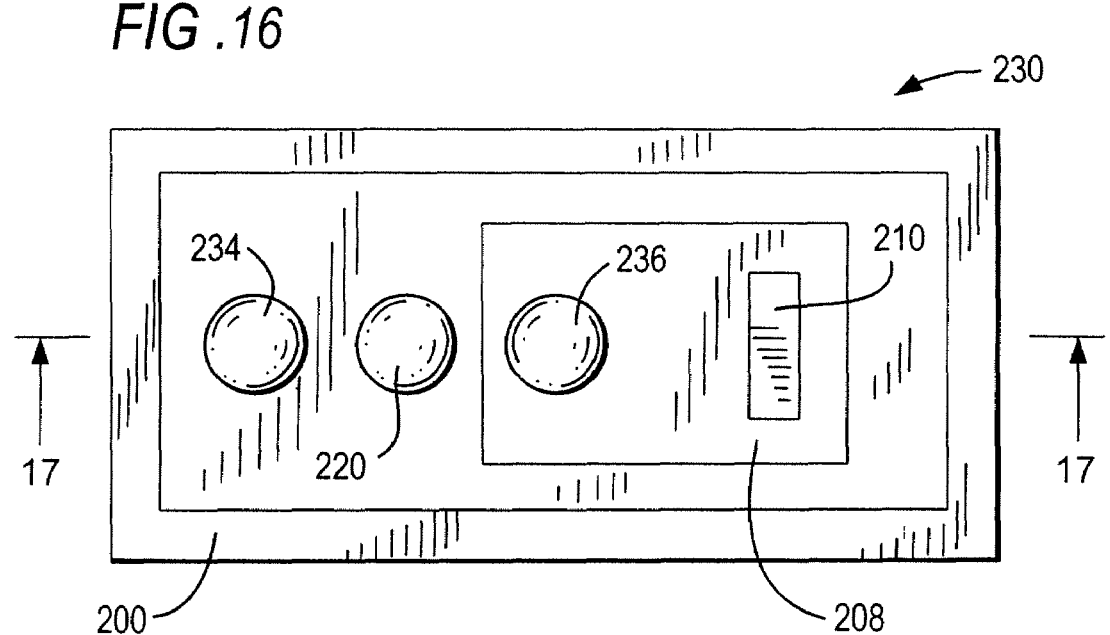
FIG. 16 is a schematic plan view of a second embodiment of a three-way combination temperature exposure indicator according to the invention.
Figure 17:
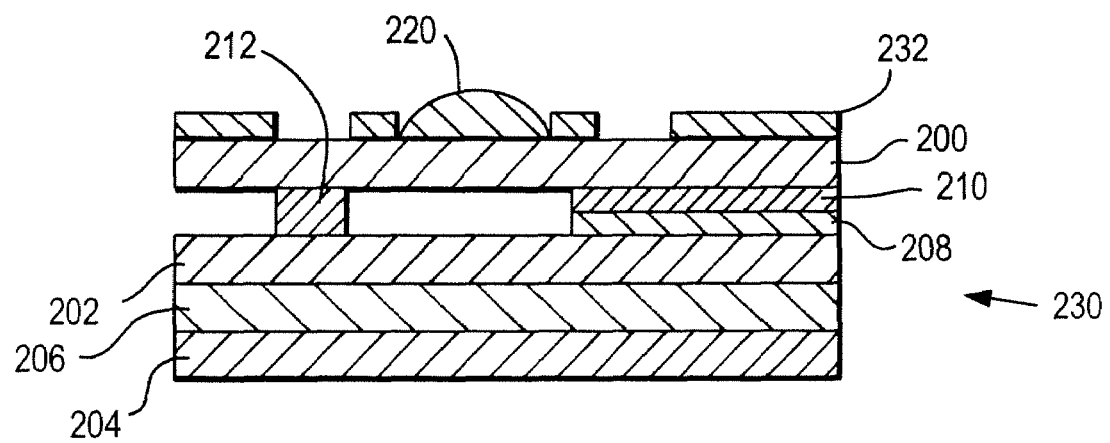
FIG. 17 is a partial cross-sectional view on the line 17-17 of FIG. 16.

The embodiment of three-way combination temperature exposure indicator shown in FIGS. 16-17 is generally similar to three-way combination indicator 198 except that the several indicators are arranged as a side-by-side array rather than being vertically aligned one on top of the other.

Referring to FIGS. 16-17, in the illustrated three-way combination temperature exposure indicator 230, cumulative time-temperature indicator 212 and wicking member 208 are arranged side-by-side and spaced apart on lower film 202. As compared with the embodiment of FIGS. 14-15, cumulative time-temperature indicator 212 is here printed, or otherwise configured as a circle, rather than a square and wicking member 208 is shortened. As shown in FIG. 17, fusible material 210 has traveled along the entire length of wicking member 208, as a result of above threshold temperature exposure.

Freeze indicator 220 is disposed centrally on transparent upper film 200, horizontally between cumulative time-temperature indicator 212 and wicking member 208. Transparent upper film 200 is printed with an opaque layer 232 defining three side-by-side windows through which the layers beneath can be viewed. Freeze indicator 220 occupies the central window. The lefthand window 234, as viewed in FIG. 16, overlies and provides a view of cumulative time-temperature indicator 212. The righthand window 236 provides a view of wicking member 208, and of fusible material 210, if present. As shown, the window provided by freeze indicator 220 and windows 234 and 236 are all circular and have the same size. However different shapes and sizes and a different arrangement of freeze indicator 220 and windows 234 and 236 on upper film 200 can be employed, if desired.

Opaque layer 232 can have any desired appearance consistent with, or facilitating viewing of indicator 220. Opaque layer 232 may also bear, or comprise, text, graphics, or other indicia, if desired. For example, opaque layer 232 can bear legends describing each of the indicator displays. In this embodiment no reference ring 214 or similar visually marked area is shown. However, a reference area can be provided if desired, corresponding to one or another of the several indicator appearances. Alternatively, opaque layer 232 can comprise a written and/or graphic guide to one or more of the possible appearances of indicator 220.

When three-way combination indicator 220 is put into use, cumulative time-temperature indicator 212, as viewed through window 234, begins with a light appearance and slowly darkens over time. Fusible material 210 is dark so that if the ambient temperature exceeds an upper threshold fusible material 210 spreads along wicking material 208, causing wicking material 208 to change from light to dark, as illustrated, presenting a dark appearance in window 236. Freeze indicator 220 is transparent, showing a colorless freeze indicator material initially. If a freezing temperature is encountered the freeze indicator material darkens.

As long as combination indicator 220 shows three light circles, the associated host product can be used. If the indicator is exposed to freezing conditions, temperatures above the threshold, or if the cumulative effects of time and temperature exceed set limits, at least one of the three initially clear or light circles displayed on upper film 200, will darken, signaling a possible problem.

Thus combination indicator 220 provides a compact, efficient, three-in-one indicator display which by means of a single signal, displaying a dark circle, clearly communicates that a host product has been exposed to at least one of a variety of possibly damaging ambient temperature parameters. Also, combination indicator 220 readily communicates which parameter has been exceeded and can show that two specific or all three parameters have been exceeded. The three indicators, are neatly integrated onto a common substrate and present common, easily read appearances.

The invention also includes two-way combination indicators similar to three-way combination indicators 198 and 220 but wherein one of the indicator structures, cumulative time-temperature indicator 212, freeze indicator 220 or the threshold indicator provided by fusible material 210 and wicking member 208, is omitted. Thus the invention provides, in this aspect, two embodiments each of a combination freeze indicator and cumulative time-temperature indicator, combination freeze indicator and threshold temperature indicator and a combination threshold indicator and cumulative time-temperature indicator.

The invention provides a variety of valuable benefits. For example, it enables fabrication of useful devices and practice of methods to improve the handling and use of perishable products. By virtue of the invention, it becomes possible easily to inspect a product susceptible to temperature aging and freeze damage at a point of use, and have confidence that it has not suffered deleterious temperature exposure. The benefits can be economically applied to small, low cost products such as vaccines and syringes. Furthermore, an easily read combination visual display with reference guide can be provided to facilitate use of the product in difficult circumstances such as may occur in vaccination programs in less developed countries, especially in hot climates.

Some examples of useful active agents for a time-temperature indicator include 2,4-hexadiyn-1,6-bis (ethylurea), also known as "KE monomer"; 2,4-hexadiyn-1,6-bis (propylurea) also known as "KPr monomer"; and co-crystallized acetylenic agents, such as a 2:1 co-crystallized mixture of the KE monomer and the KPr monomer, which mixture is also known as "KX monomer". Other polyacetylenic agents may be employed as is known. See, for example, U.S. Pat. Nos. 4,189,399 and 4,384,980 to Patel, and U.S. Pat. Nos. 4,789,637 and 4,788,151 to Preziosi et al. the disclosures of each of which are incorporated by reference herein.

The operation of the time-temperature indicators can be based on different technologies. Examples of other technologies include but are not limited to: diffusion or migration technology; time-temperature indicators requiring mechanical activation; color change technology using an oxidation-polymerizable dyestuff contacting an oxidizing agent; use of a colored thermochromic material obscuring a patch of another color, that melts and becomes transparent when exposed to a predetermined temperature; thermally sensitive image-forming technology employing an organic silver salt oxidizing agent and a reducing agent; use of thermosensitive organic crystals that lose color with temperature exposure; enzyme-based sensors; electronic time-temperature indicators with a visual output; and microbiological devices. These and other time-temperature indicating technologies are disclosed in commonly-owned U.S. provisional patent application No. 60/712,929, filed 31 Aug. 2005, by Martin et al. entitled, "FRESHNESS TRACKING," the entire disclosure of which is incorporated by reference herein. Other useful techniques will be apparent, or will become apparent, to those skilled in the art.

Another aspect of the invention provides a combination maturity indicator capable of indicating the maturity of a maturing freeze-sensitive product, for example, fruits, gourmet fish and the like, as well as possible freeze exposure of such products. In this aspect of the invention, as an alternative to a time temperature indicator, a maturity indicator can be used such as is disclosed in commonly owned U.S. patent application Ser. No. 11/119,650, filed 2 May 2005 by Prusik et al., and entitled, "Method Of Marketing Maturing Consumable Products and Products Useful Therein", the entire disclosure of which is incorporated by reference herein.

A further aspect of the invention provides a combination indicator incorporated in or associated with a radio frequency identification ("RFID") tag, for example, in the manner described for an environmental condition indicator in commonly owned U.S. Pat. Application Publication No. 2006/0145863, filed 20 Dec. 2004, and entitled "RFID Tag With Visual Environmental Condition Monitor," the entire disclosure of which is incorporated by reference herein. The combination indicator can have any of the configurations or constitutions described herein. Usefully, as is disclosed in said copending application, the RFID tag, can generate or otherwise yield identifying data for the host product monitored by the ambient temperature indicator which, as stated, can, pursuant to the present invention comprise a combination temperature indicator as described herein.

Thus the invention includes a freeze indicator and a cumulative ambient time-temperature indicator supported on a common substrate together with, or associated, with a radio frequency identification ("RFID") tag or the like. It also includes a temperature threshold indicator, as described herein, and a cumulative ambient time-temperature indicator supported on a common substrate together with, or associated, with a radio frequency identification ("RFID") tag. Furthermore, the invention includes a freeze indicator and a temperature threshold indicator supported on a common substrate together with, or associated, with a radio frequency identification ("RFID") tag.

Furthermore, the invention includes a freeze indicator as described herein or a temperature threshold indicator as described herein supported on a common substrate together with a radio frequency identification ("RFID") tag or the like.

The combination indicators of the invention can be employed to monitor the temperature exposure of any of wide variety of host products. For this purpose, the combination indicator can be associated with or attached to the host product to monitor its exposure, in any suitable manner.

Some examples of possible host products include freeze-sensitive vaccines, foodstuffs, dairy products, vegetables, plants, flowers, bulbs, biologicals, cultures, human or animal organs, pharmaceuticals, medicaments, chemicals, water-based chemicals, paints, and water-based adhesives.

Some further examples of possible freeze-perishable host products include: fruit, vegetables, dairy products, for example milk, cream, yogurt and cheese; eggs and egg-containing products; baked products, for example, breads, cakes, cookies, biscuits, pastries and pies; fresh, cooked, cured or smoked meats and fish; and roasts, steaks, chops, and whole and split carcasses of beef, veal pork, lamb, goat, game, domesticated meat, wild meat and other meat;

food service products, for example restaurant service foods, fresh cut foods, fruits, salads and the like;

mail order supplied or public carrier delivery products for example gourmet and other fruits, chocolates, cheeses, fresh and cured meats, chicken, fowl, game, and the like, and ready-to-eat or ready-to-cook meals ordered by phone, mail or Internet and delivered to a residence or business;

freeze-perishable animal foods for example pet foods and foods for agricultural, zoological or other animals;

cut and uncut flowers;

water-containing cosmetics, and cosmetics containing biologicals or other labile ingredients;

biological materials for industrial or therapeutic uses, for example cultures, organs and other human or animal body parts, blood and perishable blood products;

diagnostic devices, kits and ingredients containing freeze-perishables;

freeze-perishable health care products, for example vaccines, drugs, medicaments, pharmaceuticals, medical devices and prophylactics;

freeze-perishable chemical or biological agent detection kits useful for detecting exposure to nerve agents, blood agents, blister agents, or other toxic agents;

freeze-perishable chemicals and industrial supplies, for example water-containing products; and other freeze-perishable products as will be apparent to those skilled in the art.

Embodiments of the freeze indicator of the invention can also usefully be employed to monitor the possible freeze exposure of a wide range of maturable products, including for example:

one or more maturing consumable products selected from the group consisting of: fruits; apples; pears; kiwis; melons; grapes; grapefruit; bananas; peaches; nectarines; plums; pineapples; mangoes; guavas; dates; papayas; plantain; avocadoes; peppers; tomatoes; cheeses; soft cheese; brie cheese; camembert cheese; hard cheese; cheddar cheese; aging beef; aging steak; other aging meats and meat products; aging gourmet meats; gourmet hams; pheasant; gourmet game products; aging sausages; wines; Bordeaux wine, burgundy wine; claret; champagne; port; whisky; cognac; and other beverages that can benefit from maturation.

The invention furthermore includes quality assured maturable or maturing products comprising any of the herein described maturable host products provided with a quality assurance system according to the invention described herein.

A combination indicator as described herein can be applied to the host product at a suitable point in the production, packaging or distribution of same, for example, when assembled into final package, inspect same at selected points prior to use. At a suitable point prior to use, freeze indicator 10 is inspected and if it signals that exposure to freezing has occurred, the host product can be discarded.

DISCLOSURES INCORPORATED

The entire disclosure of each and every United States patent and patent application, each foreign and international patent publication, of each other publication and of each unpublished patent application that is specifically referenced in this specification is hereby incorporated by reference herein, in its entirety.

Throughout the description, where compositions are described as having, including, or comprising specific components, or where processes are described as having, including, or comprising specific process steps, it is contemplated that compositions of the present invention can also consist essentially of, or consist of, the recited components, and that the processes of the present invention can also consist essentially of, or consist of, the recited processing steps. It should be understood that the order of steps or order for performing certain actions is immaterial so long as the invention remains operable. Moreover, two or more steps or actions may be conducted simultaneously. In addition, all proportions recited herein are to be understood to be proportions by weight, based upon the weight of the relevant composition, unless the context indicates otherwise.

Furthermore, where a structure is illustrated as employing two material layers, the invention contemplates alternative embodiments fulfilling the functions of the two layers in a single layer.

The foregoing detailed description is to be read in light of and in combination with the preceding background and invention summary descriptions wherein partial or complete information regarding the best mode of practicing the invention may be set forth and where modifications, alternative and useful embodiments of the invention may be suggested or set forth, as will be apparent to one skilled in the art.

While illustrative embodiments of the invention have been described above, it is, of course, understood that many and various modifications will be apparent to those of ordinary skill in the relevant art, or may become apparent as the art develops. Such modifications are contemplated as being within the spirit and scope of the invention or inventions disclosed in this specification.

The invention claimed is:

1. A combination temperature exposure indicator suitable for attachment to, or association with, a host product, the combination temperature exposure indicator comprising:
    (a) a substrate;
    (b) a freeze indicator supported by the substrate; and
    (c) a cumulative ambient time-temperature indicator supported by the substrate; wherein the freeze indicator can provide a visual indication of exposure of the freeze indicator to a freezing temperature, wherein the cumulative time-temperature indicator can provide a visual indication of exposure of the cumulative time-temperature indicator to a predetermined cumulative time-temperature value and wherein the cumulative time-temperature indicator and the freeze indicator have similar visual appearances.

2. A combination temperature exposure indicator according to claim 1 wherein the visual indications provided by the freeze indicator and the cumulative time-temperature indicator are provided in respective indicator areas wherein one of the indicator areas lies within, optionally entirely within, the other indicator area.

3. A combination temperature exposure indicator according to claim 2 wherein the cumulative time-temperature indicator is supported by the freeze indicator and wherein, optionally, the cumulative time temperature indicator area has a transparent appearance prior to providing a visual indication of temperature exposure.

4. A combination temperature exposure indicator according to claim 2 wherein the other indicator area is greater than the one indicator area.

5. A combination temperature exposure indicator according to claim 1 wherein the freeze indicator and the cumulative time-temperature indicator have visually similar end points.

6. A combination temperature exposure indicator according to claim 5 comprising a reference area having a similar appearance to the freeze indicator and the cumulative time-temperature indicator at their end points.

7. A combination temperature exposure indicator according to claim 1 further comprising a threshold indicator supported on the substrate to indicate exposure of the combination indicator to a temperature above a threshold wherein the threshold indicator is arranged in a side-by-side relationship with the freeze indicator and the cumulative time-temperature indicator, and has a similar appearance to the cumulative time-temperature indicator and the freeze indicator.

8. A combination temperature exposure indicator according to claim 7 comprising an RFID tag.

9. A combination temperature exposure indicator according to claim 7 wherein both the freeze indicator and the threshold indicator have an initially clear appearance and change to a red appearance in response to exposure to a freezing temperature or a temperature above a threshold, respectively.

10. A combination temperature exposure indicator according to claim 1 comprising an RFID tag.

11. A combination temperature exposure indicator according to claim 1 wherein the freeze indicator and the cumulative time temperature indicator are arranged on the substrate in a side-by-side relationship, the substrate being attachable to a host product to be monitored, the combination temperature exposure indicator optionally including an adhesive layer to facilitate attachment to the host product.

12. A combination temperature exposure indicator according to claim 11 wherein the appearance changes of each of the freeze indicator and the cumulative time temperature indicator are irreversible and the appearance of each indicator comprises the same, similarly sized regular geometric shape, the shape optionally being a circle.

13. A combination temperature exposure indicator according to claim 12 wherein the freeze indicator and the cumulative time temperature indicator each have a common indicator appearance comprising an initially light circle which darkens to signal undesired past temperature exposure.

14. A combination temperature exposure indicator according to claim 11 wherein the substrate lacks RFID functionality.

15. A combination temperature exposure indicator according to claim 11 wherein the appearances of each of the freeze indicator and the cumulative time temperature indicator are irreversible and each comprises an initially light circle of similar size, one to the other which darkens to signal undesired past temperature exposure, and wherein the substrate lacks RFID functionality.

16. A combination temperature exposure indicator according to claim 11 wherein the freeze indicator comprises a small indicator volume.

17. A combination temperature exposure indicator according to claim 1 wherein the freeze indicator comprises a dispersion of solid colloidal particles in a liquid medium, and the freeze indicator optionally comprises a gaseous bubble visible in the indicator of the freeze indicator.

18. A combination temperature exposure indicator according to claim 17 wherein the cumulative time temperature indicator comprises an ink coating including a polymerizable diacetylenic monomer.

19. A combination temperature exposure indicator according to claim 17 wherein the freeze indicator comprises a vapor blocking envelope entirely containing the liquid medium, the vapor blocking envelope being formed of at least one vapor block material providing a loss of not more than 10 percent by weight of the liquid medium in one year of standardized shelf life, the vapor block material optionally having a moisture transmission rate of no more than about 1.0 g/m$^2$/day at a temperature of 38° C. and a relative humidity of 90%.

20. A combination temperature exposure indicator according to claim 1 comprising an attachment device for attaching the combination temperature exposure indicator to a host product, the attachment device optionally comprising an adhesive layer, a hook-and-loop fastener system, a mechanical projection, a skewer, a hook, an eye, a tape or a tie.

21. A combination temperature exposure indicator according to claim 1 comprising an attachment device for attaching the combination temperature exposure indicator to a host product wherein the freeze indicator comprises a small indicator volume, a dispersion of solid colloidal particles in a liquid medium contained in the small indicator volume, a vapor blocking envelope entirely containing the liquid medium, the vapor blocking envelope being formed of at least one vapor block material providing a loss of not more than 10 percent by weight of the liquid medium in one year of standardized shelf life, the vapor block material optionally having a moisture transmission rate of no more than about 1.0 g/m$^2$/day at a temperature of 38° C. and a relative humidity of 90%, and a visible gaseous bubble in the indicator volume; and wherein the cumulative time temperature indicator comprises an ink coating including a polymerizable diacetylenic monomer.

22. A combination temperature exposure indicator according to claim 1 wherein the substrate comprises two opposed surfaces, wherein the temperature exposure indicators are supported on one of the opposed surfaces, and wherein the combination temperature exposure indicator comprises a layer of pressure-sensitive adhesive supported on the other opposed surface and a release liner covering the adhesive.

23. A combination temperature exposure indicator according to claim 1 and the host product, wherein the combination temperature exposure indicator is attached to the host product.

24. A combination temperature exposure indicator suitable for attachment to, or association with, a host product, the combination temperature exposure indicator comprising:
   a substrate;
   a freeze indicator supported by the substrate, wherein the freeze indicator comprises:
      (a) an indicator volume;
      (b) an indicator dispersion of solid particles dispersed in a liquid medium, the indicator dispersion being contained in the indicator volume and being capable of coagulating to provide an irreversible appearance change when subject to freezing; and
      (c) at least one vapor block member extending around the indicator volume to prevent loss of liquid vapor from the indicator dispersion, and
   a cumulative ambient time-temperature indicator supported by the substrate;
   wherein the freeze indicator can provide a visual indication of exposure of the freeze indicator to a freezing temperature and the cumulative time-temperature indicator can provide a visual indication of exposure of the cumulative time-temperature indicator to a predetermined cumulative time-temperature value.

25. A combination temperature exposure indicator according to claim 24 wherein the vapor block member comprises a vapor blocking envelope entirely containing the liquid medium, the vapor blocking envelope being formed of at least one vapor block material providing a loss of not more than 10 percent by weight of the liquid medium in one year of standardized shelf life, the vapor block material optionally having a moisture transmission rate of no more than about 1.0 g/m²/day at a temperature of 38° C. and a relative humidity of 90%.

26. A combination temperature exposure indicator suitable for attachment to, or association with, a host product, the combination temperature exposure indicator comprising:
(a) a substrate;
(b) a freeze indicator supported by the substrate, wherein the freeze indicator comprises a dispersion of solid inorganic pigment particles in an aqueous dispersion medium, the dispersion exhibiting an irreversible appearance change in response to freezing of the dispersion, an indicator volume containing the inorganic pigment dispersion and a viewing window for viewing the dispersion, the freeze indicator optionally comprising an attachment device for securing the indicator to a host product to be monitored; and
(c) a cumulative ambient time-temperature indicator supported by the substrate;
wherein the freeze indicator can provide a visual indication of exposure of the freeze indicator to a freezing temperature wherein the cumulative time-temperature indicator can provide a visual indication of exposure of the cumulative time-temperature indicator to a predetermined cumulative time-temperature value.

27. A combination temperature exposure indicator suitable for attachment to, or association with, a host product, the combination temperature exposure indicator comprising:
(a) a substrate;
(b) a freeze indicator supported by the substrate, the freeze indicator being capable of providing a visual indication of exposure of the freeze indicator to a freezing temperature;
(c) a cumulative time-temperature indicator supported by the substrate, the cumulative time-temperature indicator being capable of providing a visual indication of exposure of the cumulative time-temperature indicator to a predetermined cumulative time-temperature value; and
(d) a threshold indicator supported on the substrate to indicate exposure of the combination indicator to a temperature above a threshold;
wherein the freeze indicator is initially transparent, both the cumulative time-temperature indicator and the threshold indicator are disposed behind the freeze indicator in relation to a viewer, and both the cumulative time-temperature indicator and the threshold indicator are viewable through the freeze indicator.

28. A combination temperature exposure indicator according to claim 27 wherein the cumulative time-temperature indicator is initially transparent and the threshold indicator is viewable through the cumulative time-temperature indicator.

29. A combination temperature exposure indicator according to claim 27 comprising a viewable upper surface and three viewing windows in the upper surface, wherein the freeze indicator, the cumulative ambient time-temperature indicator and the threshold indicator are separately viewable through a respective one each of the viewing windows.

30. A combination temperature exposure indicator suitable for attachment to, or association with, a host product, the combination temperature exposure indicator comprising:
(a) substrate;
(b) a freeze indicator supported on the substrate; and
(c) a cumulative ambient time-temperature indicator supported on the freeze indicator;
wherein the freeze indicator can provide a visual indication of exposure of the freeze indicator to a freezing temperature and the cumulative time-temperature indicator can provide a visual indication of exposure of the cumulative time-temperature indicator to a predetermined cumulative time-temperature value; and
wherein the visual indications provided by the freeze indicator and the cumulative time-temperature indicator are provided in respective indicator areas, wherein one of the indicator areas lies within, optionally entirely within, the other indicator area, and wherein the indicator area of the indicator situated more remotely from the substrate has a transparent appearance prior to providing a visual indication of temperature exposure.

31. A combination temperature exposure indicator according to claim 30 comprising an attachment device for attaching the combination temperature exposure indicator to a host product, wherein the freeze indicator comprises a small indicator volume, a dispersion of solid colloidal particles in a liquid medium contained in the small indicator volume, and a vapor blocking envelope entirely containing the liquid medium, the vapor blocking envelope being formed of at least one vapor block material providing a vapor loss of not more than 10 percent by weight of the liquid medium in one year of standardized shelf life, the vapor block material optionally having a moisture transmission rate of no more than about 1.0 g/m²/day at a temperature of 38° C. and a relative humidity of 90%.

* * * * *